US012632131B2

(12) United States Patent
Zhang

(10) Patent No.: US 12,632,131 B2
(45) Date of Patent: **\*May 19, 2026**

(54) LAPTOP COMPUTER WITH DYNAMIC TRACKPAD REGION

(71) Applicant: Apple Inc., Cupertino, CA (US)

(72) Inventor: Chang Zhang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/808,337

(22) Filed: Aug. 19, 2024

(65) Prior Publication Data

US 2024/0411389 A1     Dec. 12, 2024

Related U.S. Application Data

(63) Continuation of application No. 16/290,515, filed on Mar. 1, 2019, now Pat. No. 12,067,177.
(Continued)

(51) Int. Cl.
*G06F 3/0354* (2013.01)
*G06F 1/16* (2006.01)
(Continued)

(52) U.S. Cl.
CPC ........ *G06F 3/03547* (2013.01); *G06F 1/1616* (2013.01); *G06F 1/165* (2013.01);
(Continued)

(58) Field of Classification Search
CPC ...... G06F 1/016; G06F 1/1616; G06F 1/1622; G06F 1/165; G06F 3/03547;
(Continued)

(56) References Cited

U.S. PATENT DOCUMENTS

| 4,106,839 A | 8/1978 | Cooper |
| 4,256,412 A | 3/1981 | Tybus et al. |

(Continued)

FOREIGN PATENT DOCUMENTS

| CN | 101087500 | 12/2007 |
| CN | 101350849 | 1/2009 |

(Continued)

OTHER PUBLICATIONS

Author Unknown, "Improved Touchscreen Products," Research Disclosure, Kenneth Mason Publications, Hampshire, UK, GB, vol. 428, No. 53, Dec. 1, 1999.
(Continued)

*Primary Examiner* — Ke Xiao
*Assistant Examiner* — Nelson Lam
(74) *Attorney, Agent, or Firm* — Brownstein Hyatt Farber Schreck, LLP

(57) ABSTRACT

A laptop computer includes a display portion comprising a primary display and a base portion coupled to the display portion. The base portion includes a keyboard and a light-transmissive cover defining a first touch-sensitive input region along a first side of the keyboard and a second touch-sensitive input region along a second side of the keyboard. The base portion also includes a first display under the first touch-sensitive input region and a second display under the second touch-sensitive input region.

19 Claims, 15 Drawing Sheets

Related U.S. Application Data

(60) Provisional application No. 62/676,823, filed on May 25, 2018.

(51) Int. Cl.

| | |
|---|---|
| *G06F 3/01* | (2006.01) |
| *G06F 3/02* | (2006.01) |
| *G06F 3/04886* | (2022.01) |
| *G06F 3/14* | (2006.01) |
| G06F 3/0482 | (2013.01) |
| G06F 3/04845 | (2022.01) |

(52) U.S. Cl.
CPC .......... *G06F 1/1662* (2013.01); *G06F 1/1684* (2013.01); *G06F 3/016* (2013.01); *G06F 3/0202* (2013.01); *G06F 3/04886* (2013.01); *G06F 3/1423* (2013.01); *G06F 3/0482* (2013.01); *G06F 3/04845* (2013.01)

(58) Field of Classification Search
CPC ............. G06F 3/03548; G06F 3/03549; G06F 3/0393; G06F 3/041; G06F 3/0412; G06F 3/0414; G06F 3/04142; G06F 3/04144; G06F 3/04146; G06F 3/0416; G06F 3/044; G06F 3/045; G06F 3/046; G06F 3/047; G06F 3/048; G06F 3/04886
USPC .................................................. 345/173–179
See application file for complete search history.

(56) References Cited

U.S. PATENT DOCUMENTS

| | | | |
|---|---|---|---|
| 4,855,174 A | 8/1989 | Kamamoto et al. |
| 4,989,622 A | 2/1991 | Kozuka et al. |
| 5,055,347 A | 10/1991 | Bacon, Jr. |
| 5,512,374 A | 4/1996 | Wallace et al. |
| 6,061,104 A | 5/2000 | Evanicky et al. |
| 6,093,887 A | 7/2000 | Ponto et al. |
| 6,189,938 B1 | 2/2001 | Nakadaira et al. |
| 6,278,873 B1 | 8/2001 | Itakura et al. |
| 6,288,330 B1 | 9/2001 | Chen |
| 6,359,768 B1 | 3/2002 | Eversley et al. |
| 6,392,873 B1 | 5/2002 | Honda |
| 6,424,338 B1 | 7/2002 | Anderson et al. |
| 6,442,826 B1 | 9/2002 | Staudt et al. |
| 6,473,069 B1 | 10/2002 | Gerpheide |
| 6,483,024 B1 | 11/2002 | Smithson et al. |
| 6,589,891 B1 | 7/2003 | Rast |
| 6,654,256 B2 | 11/2003 | Gough |
| 6,671,160 B2 | 12/2003 | Hayden |
| 6,747,713 B1 | 6/2004 | Sato et al. |
| 6,940,731 B2 | 9/2005 | Davis et al. |
| 6,996,425 B2 | 2/2006 | Watanabe |
| 7,048,242 B2 | 5/2006 | Oddsen, Jr. |
| 7,436,653 B2 | 10/2008 | Yang et al. |
| 7,491,900 B1 | 2/2009 | Peets et al. |
| 7,586,753 B2 | 9/2009 | Lu |
| 7,604,377 B2 | 10/2009 | Yu et al. |
| 7,755,913 B2 | 7/2010 | He |
| 7,829,812 B2 | 11/2010 | Tolbert et al. |
| 7,920,904 B2 | 4/2011 | Kim et al. |
| 7,986,525 B2 | 7/2011 | Wang |
| 8,066,233 B2 | 11/2011 | Fujikawa et al. |
| 8,092,897 B2 | 1/2012 | Honma et al. |
| 8,101,859 B2 | 1/2012 | Zadesky |
| 8,164,898 B2 | 4/2012 | Lin et al. |
| D660,193 S | 5/2012 | Neuner |
| 8,195,244 B2 | 6/2012 | Smoyer et al. |
| 8,199,488 B2 | 6/2012 | Zou et al. |
| 8,358,513 B2 | 1/2013 | Kim et al. |
| 8,396,521 B2 | 3/2013 | Horimoto et al. |
| 8,456,847 B2 | 6/2013 | Hwang et al. |
| 8,509,863 B2 | 8/2013 | Vedurmudi et al. |
| 8,553,907 B2 | 10/2013 | Thomason et al. |
| 8,558,977 B2 | 10/2013 | Gettemy et al. |
| 8,587,935 B2 | 11/2013 | Lee |
| 8,654,524 B2 | 2/2014 | Pance et al. |
| 8,665,236 B2 | 3/2014 | Myers |
| 8,675,359 B2 | 3/2014 | Chen |
| 8,681,115 B2 | 3/2014 | Kurita |
| 8,744,529 B2 | 6/2014 | Freund et al. |
| 8,773,848 B2 | 7/2014 | Russell-Clarke et al. |
| 8,824,140 B2 | 9/2014 | Prest et al. |
| 8,974,924 B2 | 3/2015 | Weber et al. |
| 8,975,540 B2 | 3/2015 | Mareno et al. |
| 9,007,748 B2 | 4/2015 | Jarvis |
| 9,086,748 B2 | 7/2015 | Nam et al. |
| 9,124,676 B2 | 9/2015 | Allore et al. |
| 9,135,944 B2 | 9/2015 | Jenks |
| 9,162,519 B2 | 10/2015 | Suehiro et al. |
| 9,173,306 B2 | 10/2015 | Lim et al. |
| 9,192,072 B2 | 11/2015 | Shin et al. |
| 9,203,463 B2 | 12/2015 | Asrani et al. |
| 9,218,116 B2 | 12/2015 | Benko et al. |
| 9,250,659 B2 | 2/2016 | Tsai et al. |
| 9,390,869 B2 | 7/2016 | Lee et al. |
| 9,429,997 B2 | 8/2016 | Myers et al. |
| 9,448,631 B2 | 9/2016 | Winter et al. |
| 9,489,054 B1 | 11/2016 | Sumsion et al. |
| 9,532,723 B2 | 1/2017 | Kim et al. |
| 9,621,218 B1 | 4/2017 | Glickman et al. |
| 9,642,241 B2 | 5/2017 | Huitema et al. |
| 9,654,164 B2 | 5/2017 | Irci et al. |
| 9,693,473 B2 | 6/2017 | Hibino et al. |
| 9,740,237 B2 | 8/2017 | Moore et al. |
| 9,804,635 B2 | 10/2017 | Kim et al. |
| 9,826,649 B2 | 11/2017 | Narajowski et al. |
| 9,898,903 B2 | 2/2018 | Khoshkava et al. |
| 9,939,784 B1 | 4/2018 | Berardinelli et al. |
| 9,955,603 B2 | 4/2018 | Kiple et al. |
| 10,013,075 B2 | 7/2018 | Shipman |
| 10,042,442 B2 | 8/2018 | Kwak |
| 10,110,267 B2 | 10/2018 | Kim et al. |
| 10,321,590 B2 | 6/2019 | Cater et al. |
| 10,424,765 B2 | 9/2019 | Hwang et al. |
| 10,468,753 B2 | 11/2019 | Kim et al. |
| 10,585,494 B1 * | 3/2020 | Porcella ................. G06F 3/021 |
| 10,656,714 B2 | 5/2020 | Ligtenberg et al. |
| 10,705,570 B2 | 7/2020 | Kuna et al. |
| 10,871,828 B2 | 12/2020 | Ligtenberg et al. |
| 10,915,151 B2 | 2/2021 | Silvanto et al. |
| 10,983,570 B1 | 4/2021 | Files et al. |
| 11,099,649 B2 | 8/2021 | Ligtenberg et al. |
| 11,133,572 B2 | 9/2021 | Zhang et al. |
| 11,175,769 B2 | 11/2021 | Prest et al. |
| 11,189,909 B2 | 11/2021 | Leutheuser et al. |
| 11,258,163 B2 | 2/2022 | Froese et al. |
| 11,366,523 B2 | 6/2022 | Ligtenberg et al. |
| 11,379,010 B2 | 7/2022 | Kuna et al. |
| 11,550,369 B2 | 1/2023 | Silvanto et al. |
| 11,678,445 B2 | 6/2023 | Prest et al. |
| 11,720,149 B2 | 8/2023 | Kuna et al. |
| 11,720,176 B2 | 8/2023 | Ligtenberg et al. |
| 11,812,842 B2 | 11/2023 | Perkins et al. |
| 12,067,177 B2 * | 8/2024 | Zhang ................. G06F 3/04847 |
| 2002/0006687 A1 | 1/2002 | Lam |
| 2002/0072335 A1 | 6/2002 | Watanabe |
| 2002/0080298 A1 | 6/2002 | Fukayama et al. |
| 2002/0130981 A1 | 9/2002 | Ma et al. |
| 2004/0190239 A1 | 9/2004 | Weng |
| 2005/0140565 A1 | 6/2005 | Krombach |
| 2006/0034043 A1 * | 2/2006 | Hisano ................. G06F 1/1679 |
| | | 361/679.04 |
| 2006/0203124 A1 | 9/2006 | Park et al. |
| 2007/0195495 A1 | 8/2007 | Kim et al. |
| 2007/0229702 A1 | 10/2007 | Shirono et al. |
| 2007/0287512 A1 | 12/2007 | Kilpi et al. |
| 2008/0018475 A1 | 1/2008 | Breed et al. |
| 2008/0084384 A1 | 4/2008 | Gregorio et al. |
| 2008/0174037 A1 | 7/2008 | Chen |
| 2008/0309640 A1 | 12/2008 | Hong et al. |
| 2009/0003141 A1 | 1/2009 | Ozawa et al. |
| 2009/0041984 A1 | 2/2009 | Mayers et al. |

(56)             References Cited

U.S. PATENT DOCUMENTS

| | | | |
|---|---|---|---|
| 2009/0219156 A1 | 9/2009 | August et al. | |
| 2009/0278688 A1 | 11/2009 | Tuttle | |
| 2009/0295943 A1 | 12/2009 | Kim et al. | |
| 2009/0298547 A1 | 12/2009 | Kim et al. | |
| 2010/0061044 A1 | 3/2010 | Zou et al. | |
| 2010/0091442 A1 | 4/2010 | Theobald et al. | |
| 2010/0105452 A1 | 4/2010 | Shin et al. | |
| 2010/0137043 A1 | 6/2010 | Horimoto et al. | |
| 2010/0151925 A1 | 6/2010 | Vedurmudi et al. | |
| 2010/0157515 A1 | 6/2010 | Tseng et al. | |
| 2010/0265182 A1 | 10/2010 | Ball et al. | |
| 2010/0302016 A1 | 12/2010 | Zaborowski et al. | |
| 2010/0308998 A1 | 12/2010 | Hesch, Jr. et al. | |
| 2010/0315399 A1 | 12/2010 | Davis et al. | |
| 2011/0038114 A1 | 2/2011 | Pance et al. | |
| 2011/0047459 A1 | 2/2011 | Van Der Westhuizen | |
| 2011/0065479 A1 | 3/2011 | Nader | |
| 2011/0091051 A1 | 4/2011 | Thomason et al. | |
| 2011/0095994 A1 | 4/2011 | Birnbaum | |
| 2011/0141673 A1* | 6/2011 | Takakusaki | G06F 1/1688 |
| | | | 361/679.01 |
| 2011/0205169 A1 | 8/2011 | Yasutake et al. | |
| 2011/0292579 A1 | 12/2011 | Koga | |
| 2012/0009983 A1 | 1/2012 | Mow et al. | |
| 2012/0049000 A1 | 3/2012 | Kajita et al. | |
| 2012/0069517 A1 | 3/2012 | Prest et al. | |
| 2012/0088072 A1 | 4/2012 | Pawloski et al. | |
| 2012/0094594 A1 | 4/2012 | Rofougaran et al. | |
| 2012/0097412 A1 | 4/2012 | Wennemer et al. | |
| 2012/0175165 A1 | 7/2012 | Merz et al. | |
| 2012/0212424 A1 | 8/2012 | Sharma et al. | |
| 2012/0236477 A1 | 9/2012 | Weber | |
| 2012/0268412 A1 | 10/2012 | Cruz-Hernandez et al. | |
| 2012/0274575 A1 | 11/2012 | Solomon et al. | |
| 2012/0327008 A1 | 12/2012 | Kurita | |
| 2013/0051000 A1 | 2/2013 | Yu et al. | |
| 2013/0076649 A1 | 3/2013 | Myers et al. | |
| 2013/0162515 A1* | 6/2013 | Prociw | H04M 1/72409 |
| | | | 361/679.09 |
| 2013/0273295 A1 | 10/2013 | Kenney et al. | |
| 2013/0308282 A1 | 11/2013 | Shin et al. | |
| 2014/0015773 A1* | 1/2014 | Loeffler | G06F 3/0488 |
| | | | 345/173 |
| 2014/0031093 A1 | 1/2014 | Song et al. | |
| 2014/0139450 A1 | 5/2014 | Levesque et al. | |
| 2014/0253487 A1 | 9/2014 | Bezinge et al. | |
| 2014/0274231 A1 | 9/2014 | De Luis et al. | |
| 2014/0288438 A1 | 9/2014 | Venkatraman et al. | |
| 2014/0298478 A1 | 10/2014 | Kim et al. | |
| 2014/0311767 A1 | 10/2014 | Merz et al. | |
| 2014/0320344 A1 | 10/2014 | Sanderovich et al. | |
| 2014/0320435 A1 | 10/2014 | Modarres et al. | |
| 2014/0347799 A1 | 11/2014 | Ono et al. | |
| 2014/0368455 A1 | 12/2014 | Croisonnier et al. | |
| 2015/0001104 A1 | 1/2015 | Kim et al. | |
| 2015/0062419 A1 | 3/2015 | Hooton et al. | |
| 2015/0090571 A1 | 4/2015 | Leong et al. | |
| 2015/0109223 A1 | 4/2015 | Kessler et al. | |
| 2015/0124401 A1 | 5/2015 | Prest et al. | |
| 2015/0171916 A1 | 6/2015 | Asrani et al. | |
| 2015/0183185 A1 | 7/2015 | Chang | |
| 2015/0185946 A1 | 7/2015 | Fourie | |
| 2015/0255853 A1 | 9/2015 | Kwong et al. | |
| 2015/0364820 A1 | 12/2015 | Dong et al. | |
| 2016/0029899 A1 | 2/2016 | Kim et al. | |
| 2016/0034042 A1 | 2/2016 | Joo et al. | |
| 2016/0055729 A1 | 2/2016 | Maddox et al. | |
| 2016/0064820 A1 | 3/2016 | Kim et al. | |
| 2016/0098016 A1 | 4/2016 | Ely et al. | |
| 2016/0098107 A1 | 4/2016 | Morrell et al. | |
| 2016/0103544 A1 | 4/2016 | Filiz et al. | |
| 2016/0124532 A1* | 5/2016 | Wolff | G06F 3/0484 |
| | | | 345/157 |
| 2016/0147257 A1 | 5/2016 | Yamazaki | |
| 2016/0212839 A1 | 7/2016 | Choi et al. | |
| 2016/0254587 A1 | 9/2016 | Jung et al. | |
| 2016/0255944 A1 | 9/2016 | Baranski et al. | |
| 2016/0270247 A1 | 9/2016 | Jones et al. | |
| 2016/0308563 A1 | 10/2016 | Ouyang et al. | |
| 2016/0316574 A1 | 10/2016 | Chang et al. | |
| 2016/0327980 A1 | 11/2016 | Farahani et al. | |
| 2016/0327986 A1 | 11/2016 | Farahani et al. | |
| 2016/0349989 A1* | 12/2016 | Yu | G06F 3/041 |
| 2017/0010771 A1 | 1/2017 | Bernstein et al. | |
| 2017/0038793 A1 | 2/2017 | Kallman | |
| 2017/0048495 A1 | 2/2017 | Scalisi et al. | |
| 2017/0060201 A1 | 3/2017 | Prather et al. | |
| 2017/0094804 A1 | 3/2017 | Brodsky et al. | |
| 2017/0104261 A1 | 4/2017 | Wong et al. | |
| 2017/0230073 A1 | 8/2017 | Youn et al. | |
| 2017/0264008 A1 | 9/2017 | Ying et al. | |
| 2017/0264722 A1 | 9/2017 | Zhong | |
| 2017/0303048 A1 | 10/2017 | Hooton et al. | |
| 2018/0020208 A1 | 1/2018 | Woo et al. | |
| 2018/0026341 A1 | 1/2018 | Mow et al. | |
| 2018/0026353 A1 | 1/2018 | Tseng et al. | |
| 2018/0077328 A1 | 3/2018 | Park et al. | |
| 2018/0090847 A1 | 3/2018 | Romano et al. | |
| 2018/0120985 A1* | 5/2018 | Wallace | G06F 1/169 |
| 2018/0198212 A1 | 7/2018 | Rodriguez | |
| 2018/0210515 A1 | 7/2018 | Lyles et al. | |
| 2018/0284845 A1 | 10/2018 | Honma et al. | |
| 2019/0020365 A1 | 1/2019 | Ouyang et al. | |
| 2019/0079583 A1* | 3/2019 | Alghooneh | G06F 3/016 |
| 2019/0083715 A1 | 3/2019 | Redmond et al. | |
| 2019/0090806 A1 | 3/2019 | Clavelle et al. | |
| 2019/0103682 A1 | 4/2019 | Thai et al. | |
| 2019/0128669 A1 | 5/2019 | Nobayashi et al. | |
| 2019/0129473 A1* | 5/2019 | Hu | G06F 3/0412 |
| 2019/0312334 A1 | 10/2019 | Shin et al. | |
| 2019/0361543 A1 | 11/2019 | Zhang | |
| 2019/0377385 A1 | 12/2019 | Bushnell | |
| 2020/0037602 A1* | 2/2020 | Hicks | G02B 5/0242 |
| 2020/0058992 A1 | 2/2020 | Wu et al. | |
| 2020/0073439 A1 | 3/2020 | Amano et al. | |
| 2020/0073445 A1 | 3/2020 | Kuna et al. | |
| 2020/0174653 A1* | 6/2020 | Klein | G06F 3/04886 |
| 2020/0314567 A1 | 10/2020 | Shriner et al. | |
| 2020/0328499 A1 | 10/2020 | O'Driscoll et al. | |
| 2020/0409023 A1 | 12/2020 | Kazuo et al. | |
| 2021/0168230 A1 | 6/2021 | Baker et al. | |
| 2021/0234403 A1 | 7/2021 | Ku et al. | |
| 2021/0353226 A1 | 11/2021 | Hiemstra et al. | |
| 2022/0043293 A1 | 2/2022 | Umejima et al. | |
| 2022/0057885 A1 | 2/2022 | Prest et al. | |
| 2022/0059928 A1 | 2/2022 | Leutheuser et al. | |
| 2023/0122975 A1 | 4/2023 | Dhillon et al. | |
| 2023/0161390 A1 | 5/2023 | Silvanto et al. | |
| 2023/0333600 A1 | 10/2023 | Kuna et al. | |
| 2023/0333658 A1 | 10/2023 | Ligtenberg et al. | |
| 2024/0094765 A1 | 3/2024 | Leclerc et al. | |
| 2024/0210993 A1 | 6/2024 | Stacy et al. | |

FOREIGN PATENT DOCUMENTS

| | | |
|---|---|---|
| CN | 101753655 | 6/2010 |
| CN | 102159045 | 8/2011 |
| CN | 102405453 | 4/2012 |
| CN | 202281978 | 6/2012 |
| CN | 202735925 | 2/2013 |
| CN | 102984904 | 3/2013 |
| CN | 103168280 | 6/2013 |
| CN | 203054674 | 7/2013 |
| CN | 103327758 | 9/2013 |
| CN | 103390793 | 11/2013 |
| CN | 203416294 | 1/2014 |
| CN | 103681061 | 3/2014 |
| CN | 103777765 | 5/2014 |
| CN | 104064865 | 9/2014 |
| CN | 104427048 | 3/2015 |
| CN | 104582379 | 4/2015 |
| CN | 104742308 | 7/2015 |
| CN | 105006647 | 10/2015 |
| CN | 105228966 | 1/2016 |

(56)     References Cited

FOREIGN PATENT DOCUMENTS

| | | |
|---|---|---|
| CN | 105703060 | 6/2016 |
| CN | 105892568 | 8/2016 |
| CN | 203674398 | 12/2016 |
| CN | 106571516 | 4/2017 |
| CN | 107221506 | 9/2017 |
| CN | 107275751 | 10/2017 |
| CN | 107317121 | 11/2017 |
| CN | 107534223 | 1/2018 |
| CN | 107735903 | 2/2018 |
| CN | 207216299 | 4/2018 |
| CN | 108400425 | 8/2018 |
| CN | 108594622 | 9/2018 |
| CN | 108594623 | 9/2018 |
| CN | 208385608 | 1/2019 |
| CN | 109546295 | 3/2019 |
| CN | 109980332 | 7/2019 |
| CN | 110875974 | 3/2020 |
| CN | 112532263 | 3/2021 |
| CN | 112799294 | 5/2021 |
| EP | 2565742 | 3/2013 |
| EP | 2843501 | 3/2015 |
| EP | 2993730 | 3/2016 |
| EP | 3144768 | 3/2017 |
| EP | 3438786 | 2/2019 |
| EP | 3748464 | 12/2020 |
| GB | 2516439 | 1/2015 |
| GB | 2529885 | 3/2016 |
| JP | S58151619 | 9/1983 |
| JP | H61039144 | 2/1986 |
| JP | H05022023 | 1/1993 |
| JP | H09232849 | 9/1997 |
| JP | H10102265 | 4/1998 |
| JP | H63249697 | 10/1998 |
| JP | 2001216077 | 8/2001 |
| JP | 20023431 | 11/2002 |
| JP | 2004272690 | 9/2004 |
| JP | 2006243812 | 9/2006 |
| JP | 2007072375 | 3/2007 |
| JP | 2011014149 | 1/2011 |
| JP | 2011159276 | 8/2011 |
| JP | 2011239139 | 11/2011 |
| JP | 2011248888 | 12/2011 |
| JP | 2011249126 | 12/2011 |
| JP | 2012/019526 | 1/2012 |
| JP | 2012027592 | 2/2012 |
| JP | 2012222553 | 11/2012 |
| JP | 2013508818 | 3/2013 |
| JP | 2014501070 | 1/2014 |
| JP | 2014078240 | 5/2014 |
| JP | 2014512879 | 5/2014 |
| JP | 2014186075 | 10/2014 |
| JP | 2015031952 | 2/2015 |
| JP | 2019537909 | 12/2019 |
| KR | 20060125712 | 12/2006 |
| KR | 20110049416 | 5/2011 |
| KR | 20110076951 | 7/2011 |
| KR | 20130096048 | 8/2013 |
| KR | 20140017420 | 2/2014 |
| KR | 20140113962 | 9/2014 |
| KR | 20150012312 | 2/2015 |
| KR | 20160019833 | 2/2016 |
| KR | 20160052275 | 5/2016 |
| KR | 20160001920 | 6/2016 |
| KR | 20160134504 | 11/2016 |
| KR | 20180025126 | 3/2018 |
| KR | 20190118095 | 10/2019 |
| KR | 20200027010 | 3/2020 |
| TW | 201129285 | 8/2011 |
| TW | 201532835 | 9/2015 |
| TW | 201701119 | 1/2017 |
| WO | WO00/14826 | 3/2000 |
| WO | WO2009/002605 | 12/2008 |
| WO | WO2009/033616 | 3/2009 |
| WO | WO2009/049331 | 4/2009 |
| WO | WO2009/129123 | 10/2009 |
| WO | WO2011/130849 | 10/2011 |
| WO | WO2012/006152 | 1/2012 |
| WO | WO2012/129247 | 9/2012 |
| WO | WO2014/037945 | 3/2014 |
| WO | WO2014/149172 | 9/2014 |
| WO | WO2014/182392 | 11/2014 |
| WO | WO2015/153701 | 10/2015 |
| WO | WO2016/039803 | 3/2016 |
| WO | WO2016/053901 | 4/2016 |
| WO | WO2016/168432 | 10/2016 |
| WO | WO2018/013573 | 1/2018 |
| WO | WO2018/090295 | 5/2018 |
| WO | WO2018/142132 | 8/2018 |

OTHER PUBLICATIONS

Author Unknown, "Smart Watch—New Fashion Men/women Bluetooth Touch Screen Smart Watch Wrist Wrap Watch Phone," https://www.fargoshopping.co.ke/, 5 pages, Mar. 2016.

Kim et al., "Ultrathin Cross-Linked Perfluoropolyether Film Coatings from Liquid $CO_2$ and Subsequent UV Curing," Chem. Matter, vol. 22, pp. 2411-2413, 2010.

* cited by examiner

700

700

900

LAPTOP COMPUTER WITH DYNAMIC TRACKPAD REGION

CROSS-REFERENCE TO RELATED APPLICATION(S)

This application is a continuation patent application of U.S. patent application Ser. No. 16/290,515, filed Mar. 1, 2019 and titled "Portable Computer with Dynamic Display Interference," which is a nonprovisional patent application of and claims the benefit of U.S. Provisional Patent Application No. 62/676,823, filed May 25, 2018 and titled "Portable Computer with Dynamic Display Interface," the disclosures of which are hereby incorporated herein by reference in their entireties.

FIELD

The described embodiments generally relate to electronic devices, and, more particularly, to an electronic device having a light-transmissive cover and a display adjacent or partially surrounding a keyboard of the device.

BACKGROUND

Many electronic devices include one or more input devices that enable a user to interact with the device. Example input devices include keyboards, trackpads, or mice. Laptop computers, for example, may include a base with a keyboard and a trackpad, and a display that is hinged to the base. The keyboard may accept typing inputs via a plurality of keys. The trackpad may accept touch inputs and may be used to move a cursor on the display and to select graphical or other user interface elements displayed on the display. Some traditional trackpads are limited to a trackpad area that is generally located between the user's hands when positioned in a typing position. Most traditional trackpads are also visually static in appearance and tactile feel. The systems and techniques described herein are directed to an electronic device having a touch-sensitive cover and a display that produces a dynamic graphical output and may extend over the palm rest region of a keyboard.

SUMMARY

A laptop computer includes a display portion comprising a primary display and a base portion coupled to the display portion. The base portion includes a keyboard and a light-transmissive cover defining a first touch-sensitive input region along a first side of the keyboard and a second touch-sensitive input region along a second side of the keyboard. The base portion also includes a first display under the first touch-sensitive input region and a second display under the second touch-sensitive input region. The light-transmissive cover may further define a third touch-sensitive input region along a third side of the keyboard and the base portion may further include a third display under the third touch-sensitive input region. The first touch-sensitive input region may correspond to a palm rest region that is below the keyboard, the second side of the keyboard may correspond to a left side of the keyboard, the third side of the keyboard may correspond to a right side of the keyboard, and the first display may have an equal or higher resolution than the second display and the third display.

The base portion may include a housing component and the light-transmissive cover may be a monolithic glass member that is attached to the housing component. The first touch-sensitive input region may have a first roughness and the second and third touch-sensitive input regions may have a second roughness that is smoother than the first roughness.

The light-transmissive cover may define a continuous input surface extending over the first touch-sensitive input region and the second touch-sensitive input region, and the light-transmissive cover may define a key web of the keyboard. The laptop computer may further include a light source configured to illuminate the key web. The light source may be configured to, in a first mode of operation, illuminate a first portion of the key web with a first illumination pattern and, in a second mode of operation, illuminate a second portion of the key web with a second illumination pattern. The first portion of the key web may overlap the second portion of the key web.

A laptop computer may include a display portion comprising a primary display configured to display a graphical user interface and a base portion coupled to the display portion. The base portion may include a light-transmissive cover defining a keyboard opening and a touch-sensitive input region adjacent at least one side of the keyboard opening and including a first region having a first surface texture and a second region that at least partially surrounds the first region and has a second surface texture that is different than the first surface texture. The base portion may also include an additional display below the touch-sensitive input region.

In a first mode of operation, touch inputs applied within the first region control a cursor displayed by the graphical user interface and touch inputs applied within the second region and outside of the first region do not control the cursor displayed by the graphical user interface. In a second mode of operation, the additional display displays a graphical output that at least partially surrounds the first region and defines an expanded input region that includes the first region and at least a portion of the second region, and touch inputs applied within the expanded input region control the cursor displayed by the graphical user interface.

The first surface texture of the first region may have a first roughness and the second surface texture of the second region may have a second roughness that is smoother than the first roughness. The graphical output may resemble a visual appearance of the first surface texture. The laptop computer may further include a haptic actuator coupled to the light-transmissive cover, and, in the second mode of operation, the haptic actuator may produce a haptic output via the light-transmissive cover in response to detecting a touch input that is inside of the expanded input region and outside of the first region. The haptic output may be configured to reduce a tactile difference between the first region and the second region when a finger is slid across the second region. The touch input may include an applied force, and the haptic output may be produced in response to determining that the applied force exceeds a threshold force. The haptic output may include a tactile impulse.

A laptop computer may include a display portion comprising a primary display configured to display a graphical user interface associated with an application program and a base portion pivotally coupled to the display portion. The base portion may include a keyboard, a light-transmissive cover defining a first input region along a first side of the keyboard and a second input region along a second side of the keyboard, a touch sensing system configured to detect touch inputs applied to the first input region and the second input region, and an additional display positioned under the light-transmissive cover. The additional display may be configured to display, along the first input region, a first graphical output associated with the application program, and display, along the second input region, a second graphical output associated with the application program. The first side of the keyboard may be a lateral side of the keyboard and the second side of the keyboard may be a palm rest region below the keyboard.

The additional display may be configured to display the first and second graphical outputs when the application program is active and, when a different application program is active, display a third graphical output instead of the first graphical output and display a fourth graphical output instead of the second graphical output. The first graphical output may define a first selectable control that controls a first operation of the application program and the third graphical output may define a second selectable control that controls a second operation of the different application program.

The graphical user interface of the application program may include a first portion of an image, the first graphical output may correspond to a selectable control that is configured to control an operation of the application program, and the second graphical output may include a second portion of the image. The second portion of the image may be all of the image, the second graphical output further may include a movable preview window, and the first portion of the image may correspond to a segment of the image within the movable preview window.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
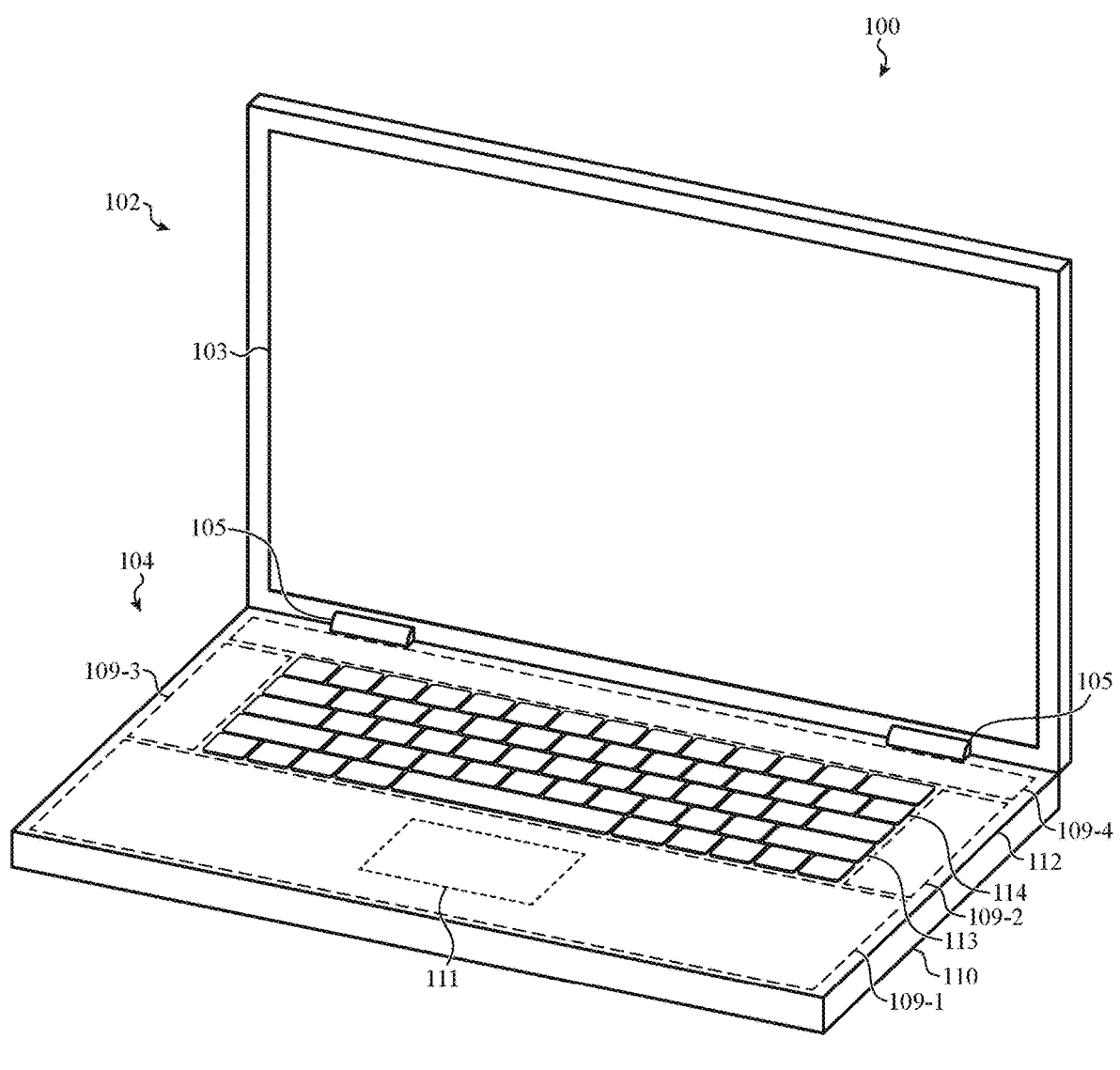
FIG. 1 depicts an example computing device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are generally directed to notebook or laptop computers with a dynamic display interface next to or surrounding the keyboard. For example, a laptop computer, which may be referred to as a portable computer or a notebook computer, may include a display portion that is hinged to a base portion that includes a keyboard. The dynamic display interface may include one or more additional displays positioned in the base portion of a laptop computer next to the keyboard. The dynamic display interface may also include touch sensing components and/or force sensing components, which may be aligned with or otherwise associated with the additional display(s) to enable the detection of touch and/or force inputs applied to the dynamic display interface. The dynamic display interface may span all or most of a palm rest region below a keyboard of a laptop computer (e.g., where a user's palms may sit when the user is typing). In some cases, the dynamic display interface may extend around one or more additional sides of the keyboard, and in some cases may completely surround the keyboard. The dynamic display interface may also use haptic outputs to provide tactile feedback to a user.

Providing a dynamic display interface next to or surrounding the keyboard of a laptop computer may enable various new and unique ways to interact with a laptop computer. For example, conventional laptops often have a dedicated trackpad of a fixed size positioned in a palm rest region of the computer. In contrast to some conventional laptops, the dynamic display interface described herein may include a touch-sensitive display that spans all or most of the palm rest region of a laptop computer (and optionally extends along two, three, or all four sides of a keyboard). The displays of the dynamic display interface may be used to dynamically produce differently sized and/or shaped trackpad-style input regions with which a user can control application programs or other aspects of the laptop. Notably, because the dynamic display interface uses dynamic displays, the particular size, shape, or other characteristic of a trackpad region may change depending on the mode of the laptop. For example, the location, shape, and/or size of a trackpad region may be modified based on the particular application that is being executed by the laptop. In one scenario, if a word processing application is active (e.g., being displayed on the primary display of the laptop), the trackpad region may be smaller or may be located in a different portion of the palm rest than if a gaming application is active. This may allow the user interface experience to be tailored for different applications or functions of the laptop computer. As used herein, a trackpad region may refer to an area on a palm rest region of a laptop computer that accepts touch and/or force inputs to control a cursor that is displayed on the primary display of a device. Touch and/or force inputs applied to a trackpad region may control other functions and/or operations of the device as well.

In addition to using a graphical output on the dynamic display interface to dynamically define the boundaries of a trackpad region, a dynamic display interface may use tactile cues to help define the boundaries of a trackpad region. For example, a haptic output delivered along the surface of the dynamic display interface may be used to help a user to tactilely perceive the boundaries of the trackpad region. More particularly, the device may produce a haptic output when the user's finger is within the boundary and not produce the haptic output when the user's finger is outside of the boundary.

In addition to being able to dynamically display different trackpad regions, the dynamic display interface may display graphical outputs, such as icons, buttons, sliders, or keys, that can be selected and/or manipulated to control the laptop. Moreover, the particular graphical outputs that are displayed are dynamic and can be changed based on the current state of the laptop and/or the particular application that is being executed. For example, if a photo editing application is being executed, the graphical outputs may be selectable icons representing photo editing controls or tools, and if a word processing application is being executed, the graphical outputs may be selectable icons representing text formatting tools. In this way, selectable controls may be displayed on the dynamic display interface in the base portion, rather than on the primary display of the laptop, thus freeing up space on the primary display for other graphical outputs. As used herein, a primary display refers to a display that provides a primary means of conveying visual information to the user, such as by displaying graphical user interfaces of application programs, operating systems, and the like. The primary display may be part of a hinged top portion of a laptop, such as is found in conventional laptop computers.

The dynamic display interface may define or provide touch-sensitive input regions located at any suitable location on the base portion. For example, as noted above, the dynamic display interface may include a display and associated touch (and/or force) sensing system positioned in a palm rest region of the laptop (e.g., below the keyboard). The dynamic display interface may also include displays and associated touch sensing systems and/or force sensing systems (which may be referred to as touch- and/or force-sensing systems for simplicity) along one or both lateral sides of the keyboard (e.g., on the left and right sides of the keyboard), and/or above the keyboard (e.g., above or in place of a function row).

In some cases, different touch-sensitive input regions around the keyboard may be associated with particular types of selectable content. The physically different locations may help indicate to a user what type of function or control may be available at that location. For example, a touch-sensitive input region that is along a left lateral side of the keyboard may be dedicated to presenting a scroll bar (or other interface). Thus, if an active application includes a graphical user interface with graphical content that can be scrolled (e.g., a document, webpage, image, etc.), the user can expect that a scroll control object will be available on the left lateral side of the keyboard regardless of what the particular application is. Similarly, the right lateral side of the keyboard may be dedicated to selectable icons that control a function of an active application. Thus, if an active application includes selectable controls, the user can expect that the controls will be available on the right lateral side of the keyboard, regardless of what the particular application is. In this way, the user experience may be consistent across multiple applications and/or graphical user interfaces that may be shown on the primary display of a laptop, as the user can expect a certain type or category of control (if relevant to the active application) to be available at a consistent location regardless of the particular application that is active. In some cases, the locations of the user interface elements may be customized by a user. For example, a user may prefer a scroll control object to be located on the right side of the keyboard. The device may allow the user to customize whether the scroll control object is located on the right side of the keyboard for all applications that use a scroll bar, or even select a subset of applications for which the scroll bar should be on the right side of the keyboard, and another subset for which the scroll bar should be on the left side of the keyboard. These and other user-selected customizations are possible for any of the graphical outputs, user interface objects, or other affordances described herein.

FIG. 1 depicts a computing device 100 (or simply "device 100") that may include a dynamic display interface incorporated into the base portion of the device. The dynamic display interface may provide new and unique ways to interact with a device. For example, the dynamic display interface may allow the device 100 to display custom sets of controls (e.g., buttons, trackpad regions, etc.) for different applications. Further, the dynamic display interface provides both input functions (e.g., touch and force sensing) and output functions (e.g., graphical outputs) in locations on the device that have formerly been unused for such purposes.

The device 100 may be or may resemble a laptop computer, also known as a notebook or portable computer, that has a display portion 102 and a base portion 104 flexibly or pivotally coupled to the display portion 102 (e.g., so that the display portion 102 is able to rotate, pivot, flex, articular, or otherwise move relative to the base portion 104). The display portion 102 includes a display 103, also referred to as a primary display, that provides a primary means of conveying visual information to the user, such as by displaying graphical user interfaces of application programs, operating systems, and the like. The display 103 may have or be characterized by a display resolution, which may be characterized by the number of pixels in a given area (e.g., pixels per inch). The display 103 may include various display components, such as liquid crystal display (LCD) components, light source(s) (e.g., light emitting diodes (LEDs), organic LEDs (OLEDs)), filter layers, polarizers, light diffusers, covers (e.g., glass or plastic cover sheets), and the like.

The display portion 102 and the base portion 104 may be coupled to one another such that they can be positioned in and moved between an open position and a closed position. In the open position, a user may be able to provide inputs to the device 100 via the base portion 104 (e.g., via a keyboard, trackpad region, etc.) while simultaneously viewing information on the display portion 102. In the closed position, the display portion 102 and the base portion 104 are collapsed against one another. More particularly, the display portion 102 and the base portion 104 may be hinged together (e.g., via a pivot or hinge mechanism 105) to form a clamshell device that can be moved between an open and a closed configuration.

The base portion 104 includes a keyboard 114. The keyboard 114 may include a plurality of individual keys that accept typing inputs. The keys may be movable, electromechanical keys that, when they are struck or otherwise actuated by a user, a keycap or other actuation surface moves and causes an electrical switch (e.g., a tactile dome switch) to open or close, thereby signaling that the key has been actuated. Other types of keys and/or switch technologies may also be used, including but not limited to movable keys that use capacitive sensors, optical sensors, resistive sensors, reed switches, or any other suitable sensors or switches. In some cases, the keyboard may not have movable keys, but instead may have a substantially solid single surface (e.g., glass, metal, plastic, ceramic, etc.) that defines multiple key regions and is associated with touch- and/or force-sensing systems that detect key inputs applied to the surface. The continuous surface of such keyboards may be part of a single cover that also defines the touch-sensitive display regions that are next to the keyboard, as described herein.

Figure 2A:
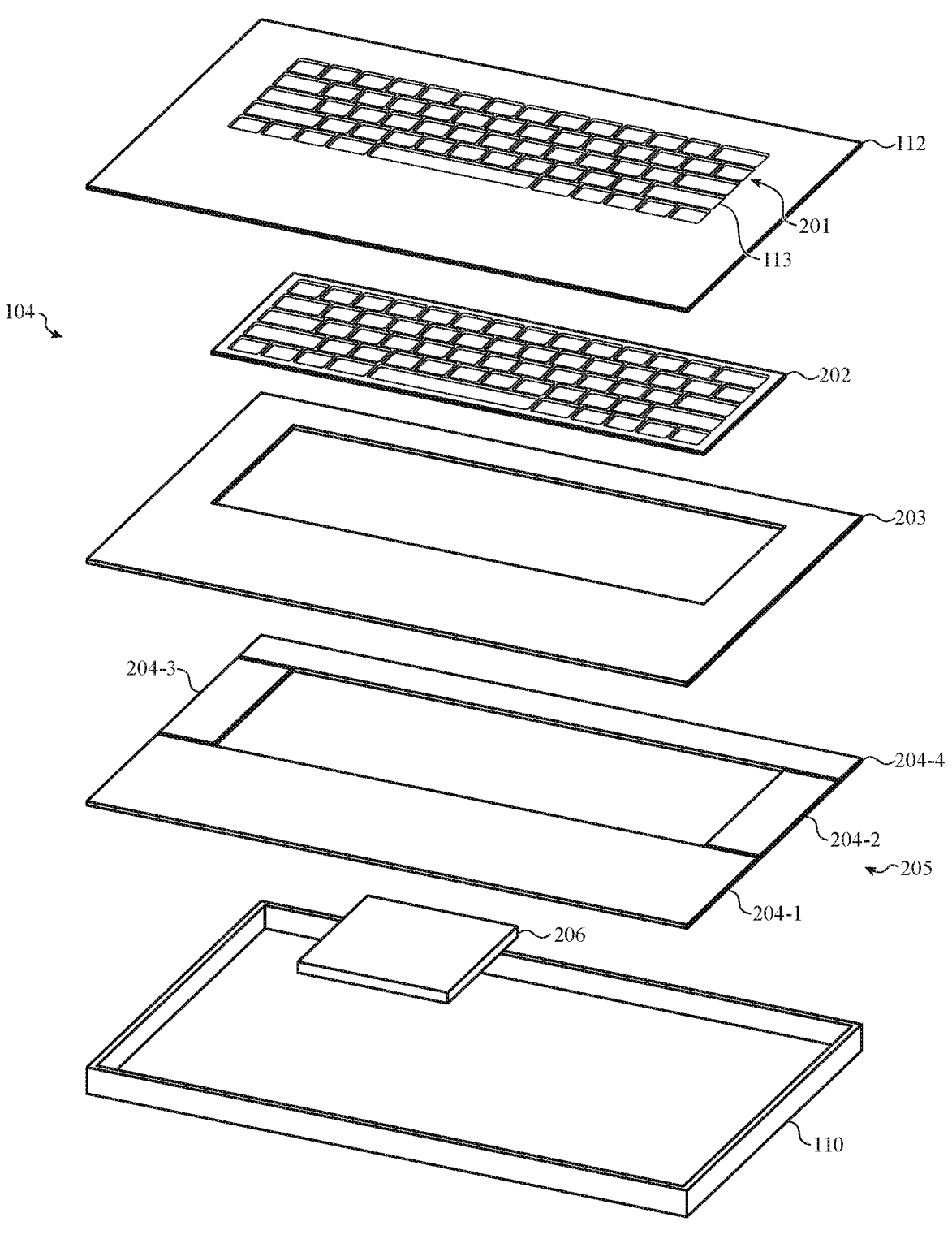
FIG. 2A depicts a partial exploded view of the computing device of FIG. 1.
Figure 2B:
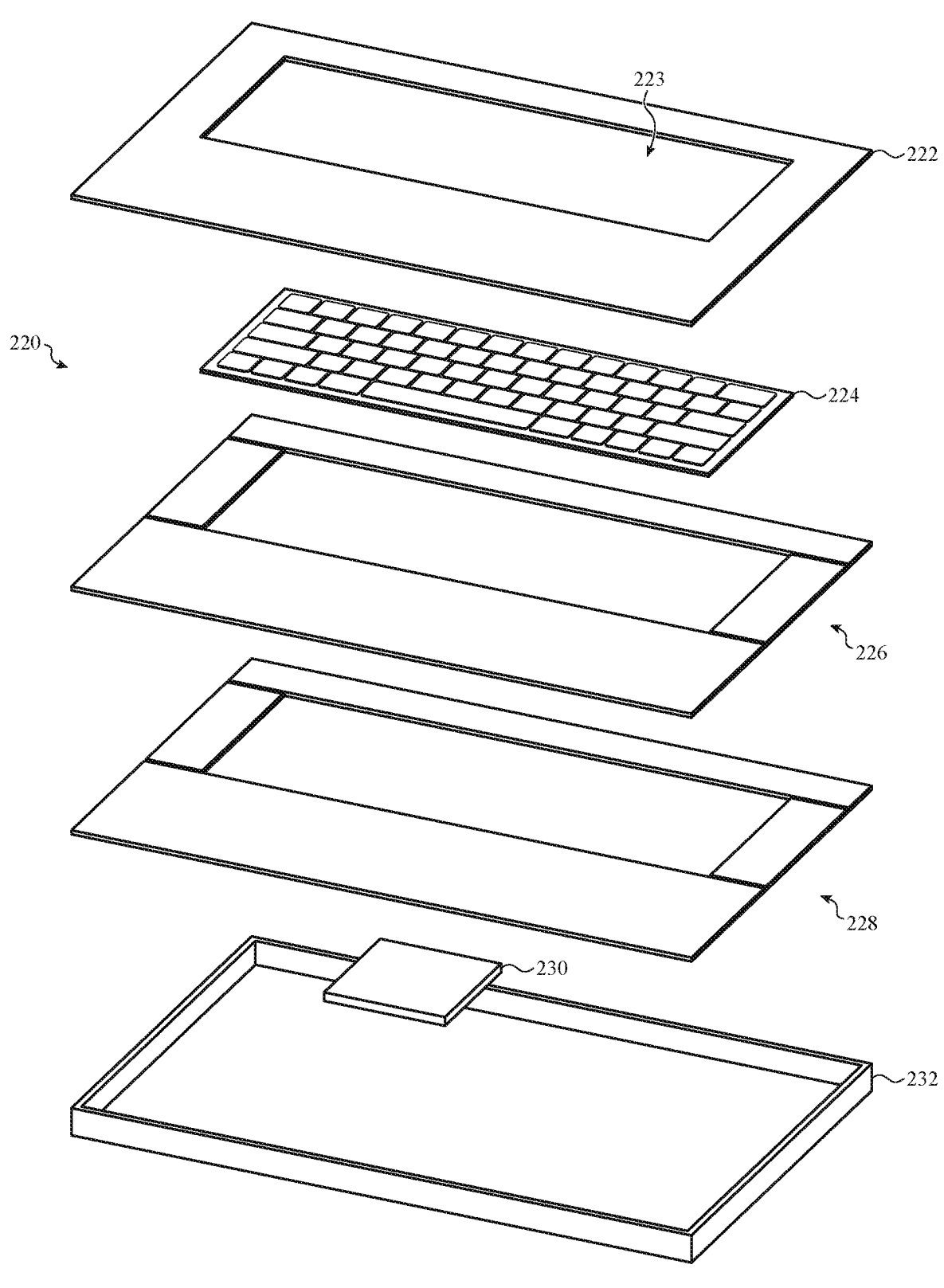
FIG. 2B depicts a partial exploded view of another example computing device.

The base portion 104 may include a light-transmissive cover 112. The light-transmissive cover 112 may include a keyboard opening in which a keyboard or a part of a keyboard may be positioned. In some cases, the keyboard opening is a single opening in which a keyboard module that includes multiple keys (e.g., all the keys of a keyboard) is positioned. In such cases, the opening may be a substantially rectangular opening and the keyboard may be positioned at least partially within the single opening. FIG. 2B shows an example exploded view of a base portion having a cover 222 with a single opening 223. In other cases, the light-transmissive cover 112 may define a key web (as shown in FIGS. 1 and 2A) with a group of keyboard openings 113 in which individual keys (or groups of individual keys) may be positioned.

Except for the keyboard opening, the light-transmissive cover 112 may define a continuous portion of the top surface of the base portion 104 (which may be the top exterior surface of the base portion 104). The exterior surface of the light-transmissive cover 112 may define the input surface of the dynamic display interface as described herein. For example, graphical outputs may be viewed through the light-transmissive cover 112, and touch inputs may be applied to the exterior surface of the light-transmissive cover 112. Accordingly, the light-transmissive cover 112 may define both a structural component of the enclosure of the device, and also part of an active input/output system.

As used herein, a continuous surface may refer to a surface or member that has no seams, openings, through-holes, or other discontinuities. Thus, the light-transmissive cover 112 may lack seams, openings, through-holes, or other discontinuities in the portion of the light-transmissive cover 112 that surrounds the keyboard opening and extends to the edges of the base portion 104. In such cases, the keyboard opening (e.g., the single keyboard opening 223 in FIG. 2B or the group of individual keyboard openings 113 in FIG. 2A) may be the only openings in the top surface of the base portion 104.

In some cases the keyboard may be a virtual keyboard or otherwise lack moving, mechanical keys, and the light-transmissive cover 112 may define the input surface of the keyboard. In such cases, the light-transmissive cover 112 may lack openings for keys and may thus define a continuous surface over the entire top of the base portion 104.

The light-transmissive cover 112 may be formed from or include a light-transmissive material, such as glass, plastic, or light-transmissive ceramics. As used herein, light-transmissive may be used to refer to something that is transparent or translucent, or otherwise allows light to propagate therethrough. In some cases, transparent materials or components may introduce some diffusion, lensing effects, distortions, or the like (e.g., due to surface textures) while still allowing objects or images to be seen through the materials or components, and such deviations are understood to be within the scope of the meaning of transparent. Also, materials that are transparent may be coated, painted, or otherwise treated to produce a non-transparent (e.g., opaque) component; in such cases the material may still be referred to as transparent, even though the material may be part of an opaque component. Translucent components may be formed by producing a textured or frosted surface on an otherwise transparent material (e.g., clear glass). Translucent materials may also be used, such as translucent polymers, translucent ceramics, or the like. As used herein, a cover that is formed from or includes a light-transmissive material and allows graphical outputs to be viewed through the cover may be considered a light-transmissive cover. Further, any cover or portion of a cover that overlies an image-forming part of a display may be understood to be light-transmissive, even if that cover or portion of the cover is not explicitly stated to be light-transmissive.

In some cases, the light-transmissive cover 112, which may be referred to simply as a cover 112 for simplicity, is a single member, such as a single monolithic glass member, a single monolithic plastic member, or a single monolithic member formed from or including any other suitable material. In other cases, the cover 112 may be formed from multiple members, either of the same material or different materials, that are bonded, adhered, joined, or otherwise coupled together to define the cover 112. The cover 112 may be light-transmissive to allow one or more displays that are positioned under the cover 112 to be visible through the cover 112, as described in more detail herein. The cover 112 may be attached to a bottom housing component 110 to define substantially all of the enclosure of the base portion 104. The cover 112 may be attached to the bottom housing component 110 via adhesive, fasteners, mechanical interlocks, or other suitable techniques.

In some cases, some portions of the cover 112 may be masked to form opaque regions. The masking may be formed using any suitable technique such as depositing an ink, dye, film, or otherwise positioning an opaque material below the cover 112 (and above any other components or layers that are intended to remain hidden or occluded). The opaque regions may be used to cover or hide internal components of the base portion 104 that may detract from the aesthetic appearance of the device or are otherwise unnecessary to see, such as structural components, fasteners, non-image forming portions of displays, electrical components, adhesives, and the like.

The cover 112 may also define touch-sensitive input regions 109 along one or more sides of the keyboard 114. The touch-sensitive input regions 109, which may be part of the dynamic display interface, may also be associated with and/or at least partially defined by underlying displays that display graphical outputs within the touch-sensitive input regions 109, as well as touch- and/or force-sensing systems that detect touch and/or force inputs applied to the cover 112. Moreover, because the cover 112 is light-transmissive, graphical outputs from the displays may be visible through the cover 112. In this way, and as described herein, the touch-sensitive input regions 109 may function as supplementary user interfaces that not only accept inputs (e.g., touch inputs, gestures, etc.), but also display dynamic graphical content that can change based on the mode of operation of the device. As described herein, the mode of operation of a device may correspond to the application program that is active on the device 100.

The touch-sensitive input regions 109 (which may refer collectively to the touch-sensitive input regions 109-1-109-4) may be located at any suitable position along the cover 112, and may have any suitable size, shape, or other property. As shown in FIG. 1, the device 100 includes a first touch-sensitive input region 109-1 that corresponds to a palm rest region that is below the keyboard 114 (e.g., it may be positioned along a bottom side of the keyboard 114, as shown in FIG. 1). The first touch-sensitive input region 109-1 may include or otherwise encompass a trackpad region 111. The trackpad region 111 may be a region in which trackpad inputs are detected and acted upon by the device 100. As used herein, trackpad inputs may correspond to or include inputs that are conventionally applied to a trackpad of a laptop computer, including but not limited to swipes (e.g., a finger being dragged along an input surface), taps (e.g., a light press on the input surface), clicks (e.g., a press on the input surface that has a greater force than a tap), multi-finger inputs and/or gestures (e.g., pinches, un-pinches, multi-finger rotations, etc.), and the like. Track-pad inputs may be used to control the position and/or movement of a cursor on the primary display of the device 100.

The trackpad region 111 may be distinguished from surrounding areas using physical and/or permanent markings on the cover 112 (e.g., using paint, etching, masking, texturing, etc.). In other cases, the trackpad region 111 may be distinguished using a graphical output from a display underlying the first touch-sensitive input region 109-1, in which case there may be no physical marking or distinguishing feature on the cover 112 itself. Various examples of techniques for dynamically defining trackpad regions using a display under the touch-sensitive input region 109-1 are described herein.

The device 100 may also include second and third touch-sensitive input regions 109-2, 109-3 positioned along second and third sides of the keyboard 114, such as along right and left lateral sides of the keyboard, respectively. The device 100 may also include a fourth touch-sensitive input region 109-4 positioned along a fourth side of the keyboard 114 (e.g., above the keyboard, or between the keyboard and the hinge mechanism). Similar to the first touch-sensitive input region 109-1, displays underlying the second, third, and/or fourth touch-sensitive input regions 109-2-109-4 may display graphical outputs within the touch-sensitive input regions and which a user may select. While FIG. 1 shows four example touch-sensitive input regions, the shapes, locations, sizes, and other properties of the touch-sensitive input regions are merely examples, and other implementations may have touch-sensitive input regions of different shapes, locations, sizes, etc. Moreover, more or fewer touch-sensitive input regions similar to those shown and described herein may be used. For example, in some cases the only touch-sensitive input region is the first touch-sensitive input region 109-1 (e.g., the palm rest region). The cover 112 may define the input surfaces of the touch-sensitive input regions 109. For example, the top surface of the cover 112 may be the surface that a user touches to interact with the touch-sensitive input regions 109. Moreover, the continuous construction of the cover 112, as described above, results in a continuous input surface extending over all of the touch-sensitive input regions. For example, a cover formed of a monolithic light-transmissive glass or plastic defines a single continuous surface that extends completely around the keyboard 114.

FIG. 1 shows the touch-sensitive input regions 109 as having distinct boundaries. In some cases, these boundaries correspond to physically distinct displays under the cover 112 (e.g., each touch-sensitive input region 109 may correspond to its own display having a size and shape that corresponds to that of the corresponding touch-sensitive input region 109). In other cases, the boundaries may not correspond to or be defined by the physical display components. For example, a single display may span multiple touch-sensitive input regions 109.

As described herein, each of the touch-sensitive input regions 109 may be configured to display different types of user interface content, which may include images, virtual buttons, virtual dials, virtual keys, icons, or other graphical outputs. Moreover, the type of user interface content that is displayed in a given touch-sensitive input region 109 may be consistent, where feasible, across multiple states of operation of the device 100. For example, the third touch-sensitive input region 109-3 may display a scroll control object when an application being executed by the device 100 includes scrollable content, and the second touch-sensitive input region 109-2 may display selectable graphical outputs for controlling application functions when an application includes selectable functions. In some cases, if the application does not include scrollable content or selectable functions, the second and third touch-sensitive input regions 109-2, 109-3 may be blank, or they may have other types of content. By maintaining consistency between particular touch-sensitive input regions and particular types of content, user confusion can be avoided, as they will become familiar with a particular layout of user interface options that is consistent across multiple applications and/or states of the device.

FIG. 2A is a partial exploded view of the base portion 104 of the device 100. The display portion 102 of the device 100 is omitted from FIG. 2A for clarity. As described above, the device 100 includes a cover 112 that defines a top exterior surface of the base portion 104. The cover 112 may be formed of any suitable light-transmissive material, such as glass, ceramic, sapphire, plastic, or the like. The cover 112 may have a uniform surface texture across the entire top surface of the cover 112, or it may have different regions that have different surface textures, as described herein. For example, as shown in FIG. 1, the trackpad region 111 may have a surface texture having a greater roughness than surrounding or adjacent portions of the cover 112. Roughness may be quantified or described in any suitable manner, such as using a roughness parameter (e.g., $R_a$, $R_z$, $R_q$, $R_{sk}$, or the like).

As shown in FIG. 2A, the cover 112 includes a key web 201. The key web 201 defines a plurality of openings 113 (e.g., keyboard openings) in which keys or parts of keys (e.g., keycaps) may be positioned. The key web 201 may be integral with the other portions of the cover 112. For example, the cover 112 may be formed of a single piece of plastic, glass, ceramic, or another suitable light-transmissive material. Accordingly, the key web 201 may also be light-transmissive (e.g., transparent), allowing light from an underlying light source to be viewed through the material that defines the key web 201. As noted above, in some cases instead of a key web 201, the cover 112 may include a single opening in which an entire keyboard module may be positioned. In such cases, the keyboard module may include a separate key web.

The keyboard is omitted from FIG. 2A for clarity. However, it will be understood that the keyboard may be positioned at any suitable position relative to the components shown in FIG. 2A so that the keys of the keyboard are exposed along the top of the base portion 104 and are capable of being actuated by a user. The keyboard may include multiple individual key mechanisms, which may include keycaps, switches (e.g., electrical switches such as collapsible dome switches, optical switches, etc.) and/or other components to facilitate the physical actuation and detection of key presses.

The device 100 may also include a key web light source 202. The key web light source 202 may be positioned under the cover 112 and aligned with the key web 201 of the cover 112 to illuminate the key web 201. Because the key web 201 may be light-transmissive, the light source 202 may transmit light through the light-transmissive material of the key web 201. The key web light source 202 may be configured to dynamically illuminate different regions of the key web 201. For example, under some conditions (e.g., based on the particular application program being executed) the key web light source 202 may illuminate a portion of the key web 201 around a first subset of keys, and under other conditions (e.g., when a different application program is being executed), the key web light source 202 may illuminate a different portion of the key web 201 around a different subset of keys. Other types of visual outputs may also be provided by the key web light source 202, as described herein. In this way additional information may be provided to a user via the key web 201.

The key web light source 202 may use any suitable light source and/or display technology. For example, the key web light source 202 may be or may include a pixelated display, such as one or more light emitting diode (LED) displays, organic LED (OLED) displays, liquid crystal displays (LCD), or the like, arranged in the shape as shown in FIG. 2A. In other cases, the key web light source 202 may include one or more light guides (alone or together having the shape shown in FIG. 2A) and one or more light sources that emit light into the one or more light guides. In either case, the light output from the key web light source 202 may be dynamic as to the colors, locations, images, portions of the key web 201 that are illuminated, and/or other properties of the light emitted by the key web light source 202.

The device 100 may also include touch sensing components and/or force sensing components 203 (referred to as touch- and/or force-sensing components for simplicity). The touch- and/or force-sensing components are represented in FIG. 2A as a layer that is positioned below the cover 112 and above the display(s) that are visible through the cover 112, though other configurations are also possible. The touch- and/or force-sensing components 203 may be part of touch- and/or force-sensing systems that detect touch and/or force inputs applied to the cover 112. For example, the touch- and/or force-sensing components 203 may be coupled to processors, memory, circuitry, or other components that, along with the touch- and/or force-sensing components 203, can detect touch and/or force inputs applied to the cover 112. See, for example, FIG. 9 directed to example device components. In some cases, the touch- and/or force-sensing components 203 include electrode layers that detect changes in capacitance due to the application of a touch and/or force input on the cover 112.

The touch- and/or force-sensing components 203 may include any suitable components and may use any suitable technique for sensing touch and/or force inputs. For example, the touch sensing components may include an array of capacitive electrodes that may operate using a self-capacitive or mutual-capacitive sensing scheme. A touch sensing system may determine, based on an electrical response from the touch sensing components, a location of one or more touch inputs applied to an input surface (e.g., the cover 112). The touch sensing system may be configured to determine the location of multiple simultaneous touch inputs. The force sensing components may include a strain sensor, capacitive gap sensor, or other force sensitive structure that is configured to produce an electrical response that corresponds to an amount of applied force associated with a touch input. The electrical response may increase continuously as the amount of applied force increases. Accordingly, the force sensing system may determine, based on the electrical response of the force sensing components, one or more properties of the applied force associated with a touch input (e.g., the magnitude of the applied force).

Touch and force sensing functions may be performed by a single system, or by multiple distinct systems. For example, the touch- and/or force-sensing components 203 may include one or more first electrode layers (or other components) that are coupled to dedicated circuitry for touch sensing, and one or more second electrode layers (or other components) that are coupled to separate dedicated circuitry for force sensing. As another example, the touch- and/or force-sensing components 203 may include different layers for touch and force sensing functions, but may be coupled to a single combined processing system. Other configurations and combinations are also possible, including touch- and/or force-sensing components and systems that are not substantially planar layers under the cover 112. In some cases, the touch- and/or force-sensing components 203 span multiple touch-sensitive input regions 109 (FIG. 1), as shown in FIG. 2A. In other cases, the touch- and/or force-sensing components 203 are segmented so that each touch-sensitive input region 109 has its own touch- and/or force-sensing component. Other configurations are also possible.

The device 100 may also include a display system 205 under the cover 112. The display system 205 may be configured to display graphical outputs that are visible through the cover 112, and thus provide graphical output functionality to the touch-sensitive input regions, as described herein. Example graphical outputs that may be displayed by the display system 205 are discussed herein and include trackpad region boundaries, selectable application controls, scroll bars, images, photographs, etc.

The display system 205 may include one display or multiple displays. As shown, the display system 205 includes four displays 204-1, 204-2, 204-3, and 204-4 (collectively referred to as displays 204), each positioned under a different touch-sensitive input region of the device 100. For example, with reference to FIG. 1, the first display 204-1 may be positioned under the first touch-sensitive input region 109-1, the second display 204-2 may be positioned under the second touch-sensitive input region 109-2, the third display 204-3 may be positioned under the third touch-sensitive input region 109-3, and the fourth display 204-4 may be positioned under the fourth touch-sensitive input region 109-4. In cases where the display system 205 includes a single display, it may include an opening corresponding to the keyboard 114. In some cases, a single display may have a "u-shape" that includes a bottom portion (e.g., corresponding to the first display 204-1) and side portions (e.g., corresponding to the locations of the second and third displays 204-2, 204-3), while excluding a top portion (e.g., corresponding to the location of the fourth display 204-4).

Providing each touch-sensitive input region 109 with a separate display, as shown in FIG. 2A may facilitate the use of displays having different features and/or properties. For example, in some cases the displays 204 do not all have the same resolution (measured in, for example, pixels-per-inch). More particularly, the first display 204-1 may have a higher resolution than the second, third, and fourth displays 204-2, 204-3, and 204-4. This may be beneficial where the types of graphical content displayed by the first display 204-1 (e.g., photographs, images, maps, screenshots, etc.) benefit more from a higher resolution display than the types of graphical content displayed by the other displays 204-2, 204-3, 204-4 (e.g., application control icons, volume sliders, scroll bars, etc.). In other cases the first display 204-1 may have the same or a lower resolution than the other displays 204-2, 204-3, 204-4. Further, providing a separate display for each touch-sensitive input region may allow simpler display shapes to be used (e.g., rectangular displays) as compared to a single display that spans all input regions (which may require an opening in the middle to accommodate a keyboard). In some cases, any or all of the displays 204 may have a different resolution than that of the primary display of the device 100 (e.g., the display 103 in the display portion 102, FIG. 1).

The displays 204 may be any suitable type of display. For example, the displays 204 may be or may include light emitting diode (LED) displays, organic LED (OLED) displays, liquid crystal displays (LCD), arrays of individual light sources (e.g., individual LEDs), or any other suitable type of display. Moreover, the displays 204 may all be the same type of display, or they may be different from one another. For example, the first display 204-1 may be an OLED display, and the second and third displays 204-2, 204-3 may be LED displays.

The device 100 may also include a haptic actuator 206 within the base portion 104. The haptic actuator 206 is configured to produce a haptic output that may include movement (e.g., vibration or displacement) of the cover 112. The movement caused by the haptic actuator 206 may be perceptible as tactile feedback to the user when the user is in contact with the cover 112 or other portion of the device 100. The haptic output may be produced by any suitable technique, including vibrations, oscillations, impulses (e.g., non-periodic forces or movements), local or global deformations of the cover 112, or any other suitable technique. As described herein, haptic outputs may be used for various output purposes, such as to indicate to a user that a touch and/or force input has been registered (e.g., simulating a click of a mechanical switch). For example, in some cases the haptic actuator 206 produces a haptic output in response to the device 100 determining that an applied force (e.g., a force of a touch input applied to the cover 112) exceeds a threshold force, as measured or detected by a force sensing system. More particularly, when a user presses on the cover 112 to make a selection, similar to clicking a mouse button or a heavy press on a trackpad surface, a force sensing system determines if the applied force exceeds a force threshold, and if so, the haptic actuator 206 may produce a haptic output to provide tactile feedback to the user and optionally to simulate the feel of a mechanical switch. The haptic output produced in response to detecting a force that exceeds the force threshold may be a tactile impulse, a vibration, or any other suitable haptic output. Haptic outputs may also be used to reduce a tactile difference between textured and untextured surfaces of the cover 112, as described herein.

The haptic actuator 206 may be any suitable mechanism and may be coupled to the device 100 in any suitable way. In some cases, it is mounted to a stack that includes the cover 112, the display system 205, and the touch- and/or force-sensing components 203. In other cases is it mounted to the bottom housing component 110 (or another component within the base portion 104), and forces that produce the haptic output are transmitted to the cover 112 indirectly through the physical structures of the base portion 104.

The bottom housing component 110 may form a bottom and one or more side surfaces of the base portion 104, and may define a cavity in which components of the device 100 are positioned. The bottom housing component 110 may be formed from any suitable material, including metal (e.g., aluminum, magnesium, titanium, metal alloys, etc.), glass, ceramic, plastic, or the like.

FIG. 2B is a partial exploded view of a base portion 220, showing another example configuration of a cover. The base portion 220 may be another embodiment of a base portion that may be used with the concepts described herein.

Accordingly, references herein to the base portion 104 may be understood to refer equally or by analogy to the base portion 220.

The base portion 220 includes a cover 222 that defines a top exterior surface of the base portion 220. The cover 222 may be similar to the cover 112 in all respects, except instead of defining a key web with multiple key openings, as illustrated by the cover 112 in FIG. 2A, the cover 222 defines a single keyboard opening 223.

A keyboard assembly 224 may be positioned at least partially within the keyboard opening 223. The keyboard assembly 224 may include any suitable components. For example, the keyboard assembly 224 may include a substrate, key make sensing components (e.g., dome switches, electrodes, etc.), mechanical support structures (e.g., hinges, scissor mechanisms, guides, etc.), keycaps, fabric covers, sealing membranes, and the like. The keyboard assembly 224 may also include a key web and a light source that may dynamically illuminate different regions of the key web, similar to the key web 201 and light source 202 described with respect to FIG. 2A.

The base portion 220 may also include other components that are the same as or similar to those shown in FIG. 2A. For example, the base portion 220 may include touch- and/or force-sensing components 226. The touch- and/or force-sensing components 226 may be the same as or similar to the touch- and/or force-sensing components 203, but instead of a continuous construction that spans all of the touch-sensitive input regions, they may include multiple discrete units, each unit corresponding to one of the touch-sensitive input regions 109 of the device 100. The base portion 220 may also include a display system 228 (which may be the same as or similar to the display system 205), a haptic actuator 230 (which may be the same as or similar to the haptic actuator 206), and a bottom housing component 232 (which may be the same as or similar to the bottom housing component 110).

As described above, the displays in the base portion 104 may be configured to display graphical outputs that are visible through the cover 112. Such graphical outputs may be used for various purposes, such as to define selectable controls that control an operation of an application program executed by the device 100 or other functions of the device 100. In the case of the first display 204-1, this display may underlie the palm rest region of the device 100 (e.g., the portion of the cover 112 where a user typically rests his or her hands when typing on the keyboard). This region may also be where conventional trackpads are positioned. Because of the display 204-1, the device 100 may provide enhanced trackpad functionality as compared to conventional static trackpad regions.

While FIGS. 2A-2B illustrate example devices with a mechanical keyboard and a cover with one or more openings to accommodate components of the mechanical keyboard, in some embodiments the mechanical keyboard may be omitted. In such cases, the cover may define a single, continuous top surface with no openings for keys or a keyboard, and the display assembly and touch- and/or force-sensing components may extend along substantially the entire bottom-facing surface of the cover. The display assembly may display a virtual keyboard, and the touch- and/or force-sensing components may facilitate detection of key presses on the virtual keyboard.

Figure 3A:
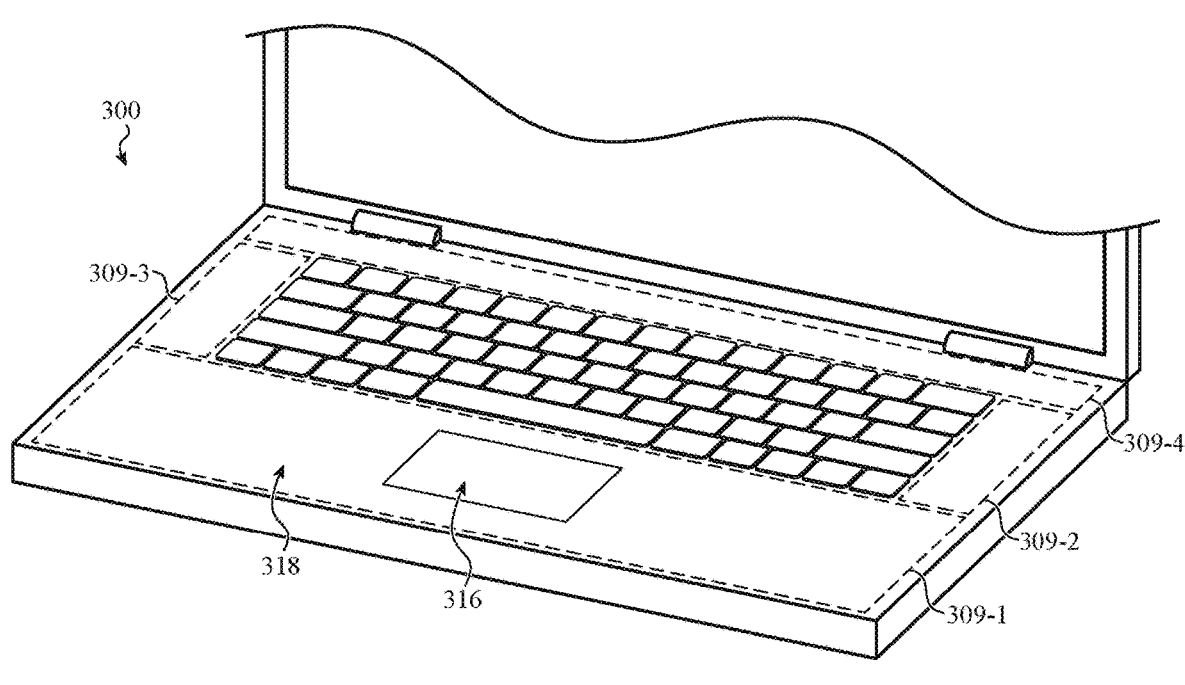
FIG. 3A depicts a portion of an example computing device in a first mode of operation.
Figure 3B:
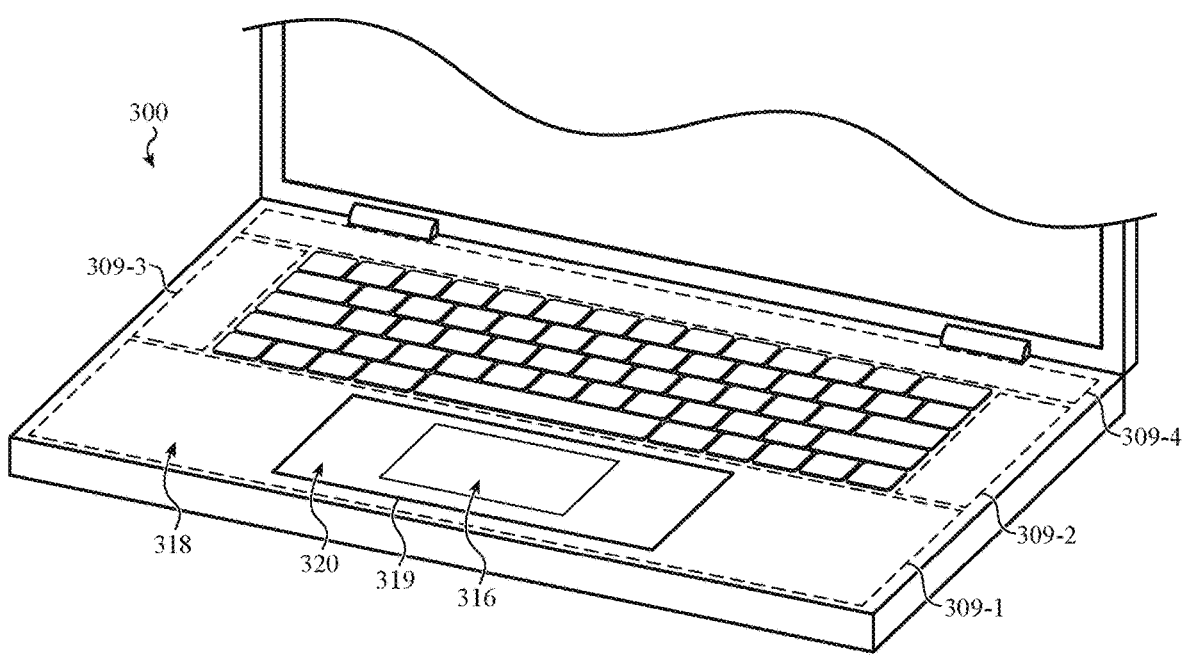
FIG. 3B depicts the computing device of FIG. 3A in a second mode of operation.

FIGS. 3A-3B illustrate a portion of a device 300, which may be an embodiment of the device 100 of FIG. 1 and therefore may include the same and/or similar components as the device 100. The device 300 may include a cover 312

(which may be an embodiment of the cover 112) that may be light-transmissive along at least a portion of the cover 312. The cover 312 may define a single keyboard opening in which a keyboard may be positioned, or it may define a key web with multiple openings for keys of the keyboard. Like the cover 112, the cover 312 may define first, second, third, and fourth touch-sensitive input region 309-1-309-4.

The first touch-sensitive input region 309-1 may have a first region 316, which may correspond to a trackpad region, that is distinguishable from a second region 318 that at least partially surrounds the first region 316 (and may correspond to the rest of the first touch-sensitive input region 309-1). The first region 316 may be distinguished from the second region 318 in any suitable manner, including tactilely and/or visually. The first region 316 may be visually distinguished by a border (as shown) that defines the first region 316. The border may be formed in any suitable way, such as via paint, dye, etching (e.g., in the top or bottom surface of the cover 312), or any other suitable technique. As another example, the border may be produced by a display under the first touch-sensitive input region 309-1. In some cases, instead of or in addition to a visible border as described above, the first region 316 may be tactilely distinguished from the second region 318. In order to produce the tactile distinction between the first region 316 and the second region 318, the first region 316 may include a surface texture that is different from the surface texture of the second region 318. In some cases, the property that produces a tactile distinction also contributes to the visual distinction. For example, the surface texture in the first region 316 may be visually distinct than an un-textured or smooth surface of the second region 318.

The first region 316 may define a trackpad region that is active when the device 300 is in a first mode of operation. As used herein, a mode of operation may correspond to any suitable state or mode of the device 300. For example, a mode of operation may correspond to a particular application program, or a particular type, class, or category of application program, being active on the device 300. A mode of operation may also correspond to a particular type of user interface being active on the device.

In a first mode of operation, such as when a first application program is active, the device 300 treats the first region 316 as a trackpad region that can control the operation of the device 300 similar to a conventional trackpad, such as by controlling the position and/or movement of a cursor that is displayed on a display of the device 300. For example, in the first mode of operation, touch inputs that are applied to the cover 312 within the first region 316 may control a cursor displayed by a graphical user interface on the primary display of the device 300, while touch inputs applied within the second region 318 and outside of the first region 316 do not control the cursor displayed by the graphical user interface (e.g., touch inputs applied outside the first region 316 may be ignored).

When the device 300 is in a second mode of operation, such as when a second application program is active, the device 300 may activate an expanded trackpad region to provide a larger area (or a smaller or differently shaped area) in which a user may provide trackpad inputs. For example, in the second mode of operation, a display corresponding to the first touch-sensitive input region 309-1 (e.g., the display 204-1, FIG. 2A) may display a graphical output 319 that at least partially surrounds the first region 316 and defines an expanded input region 320 that includes the first region 316 and at least a portion of the second region 318. The graphical output 319 may be a border (e.g., one or more lines), a colored area, an image, or any other suitable graphical output that visually distinguishes the expanded input region 320. While the device 300 is in the second mode of operation and the expanded input region 320 is displayed or otherwise active, touch inputs applied inside the expanded input region 320 are operative to control a cursor that is displayed by the graphical user interface on the primary display of the device 300. More particularly, the entire expanded input region 320 may act as the trackpad region in the second mode of operation, rather than only the first region 316.

The device 300 may also respond to touch and/or force inputs differently based on the mode of operation of the device 300. For example, as suggested above, in the first mode of operation, the device 300 may be configured to respond in a particular way to inputs provided within the first region 316 (e.g., treating the inputs as trackpad inputs) while ignoring inputs provided outside of the first region 316. In the second mode of operation, the device may be configured to respond differently than in the first mode of operation. For example, the device 300 may treat inputs inside the first region 316 and inside the expanded input region 320 as trackpad inputs, while ignoring inputs provided outside the expanded input region 320.

The expanded input region 320 may provide a larger trackpad region with which users may interact to control the device 300. However, the larger input surface may not necessarily be desirable or useful in all operating modes or for all application programs. For example, a large trackpad region may be advantageous when controlling graphics programs and games, where users manipulate graphical outputs displayed on a primary display (e.g., moving an animated character around a virtual world, translating or rotating graphical objects in a computer aided drafting program, or the like), but may be disadvantageous when inputting text into an email editor or word processing program. For example, a larger trackpad region, such as the expanded input region 320, may increase the likelihood of detecting unintended inputs due to a user's hands resting on the palm rest region during typing, and the larger size may not be necessary or particularly useful for such applications. By dynamically changing the size and/or shape of the trackpad region based on the mode of operation of the device, the device 300 may provide an input experience that is tailored for each of various different uses or functions of a device. Stated another way, the device 300 does not have to compromise on the size and/or shape of the trackpad to try to accommodate each and every possible use. Rather, the size and shape of the trackpad can be customized to an ideal or preferred size for each application. Further, users may be able to customize the size of the first region 316 and/or the expanded input region 320, and may in fact be able to customize the size of the input region for different application programs or other modes of operation of the device 300.

As noted above, haptic outputs may be provided via the cover 312 in response to the detection of particular inputs in the trackpad region. For example, when a user presses in the trackpad region with sufficient force (e.g., when the force exceeds a threshold), a haptic output may be produced via the cover 312 to inform the user that the input has been detected and/or registered. When the device 300 is in the first mode of operation, the haptic output may be produced when an input having an applied force that exceeds a threshold force is detected within the first region 316. In the first mode of operation, if an input exceeding the threshold force is detected outside the first region 316, the input may not be registered and the device 300 may produce no haptic output. In the second mode of operation, on the other hand, an input may be registered and a haptic output may be produced when an input having an applied force that exceeds a threshold force is detected within the expanded input region 320 (which includes and/or encompasses the area of the first region 316).

As described above, a portion of the cover of a device, such as a trackpad region, may have a surface texture that differs from its surroundings. The surface texture may help visually and/or tactilely distinguish a trackpad region of the cover (e.g., where touch inputs are detected and/or registered) from other regions of the cover (e.g., where touch inputs are ignored or where non-trackpad style inputs are displayed, such as buttons or icons). The surface texture may have a greater roughness than surrounding or adjacent areas of the cover. For example, the surface texture of the trackpad region may be rougher than the surrounding areas of a cover (e.g., the surrounding areas may be smoother than the trackpad region). The greater roughness of the trackpad region may have or may result in lower friction (e.g., a lower coefficient of static and/or kinetic friction) than the surrounding areas, which may be polished surfaces. The lower friction of the rougher trackpad region may provide a different tactile feel than the smooth, polished surfaces, especially when a user is sliding a finger or appendage over the trackpad region to provide an input to the device. For example, it may feel as though it takes less force or effort for a user to slide a finger over the rougher, textured surface as compared to a less rough surface. The lower friction of a textured surface may be an effect of the texturing. For example, the texturing may reduce the overall contact area between a finger and the surface, which may lead to a lower actual or perceived frictional force between the finger and the surface (as compared to a non-textured surface).

Figure 4A:
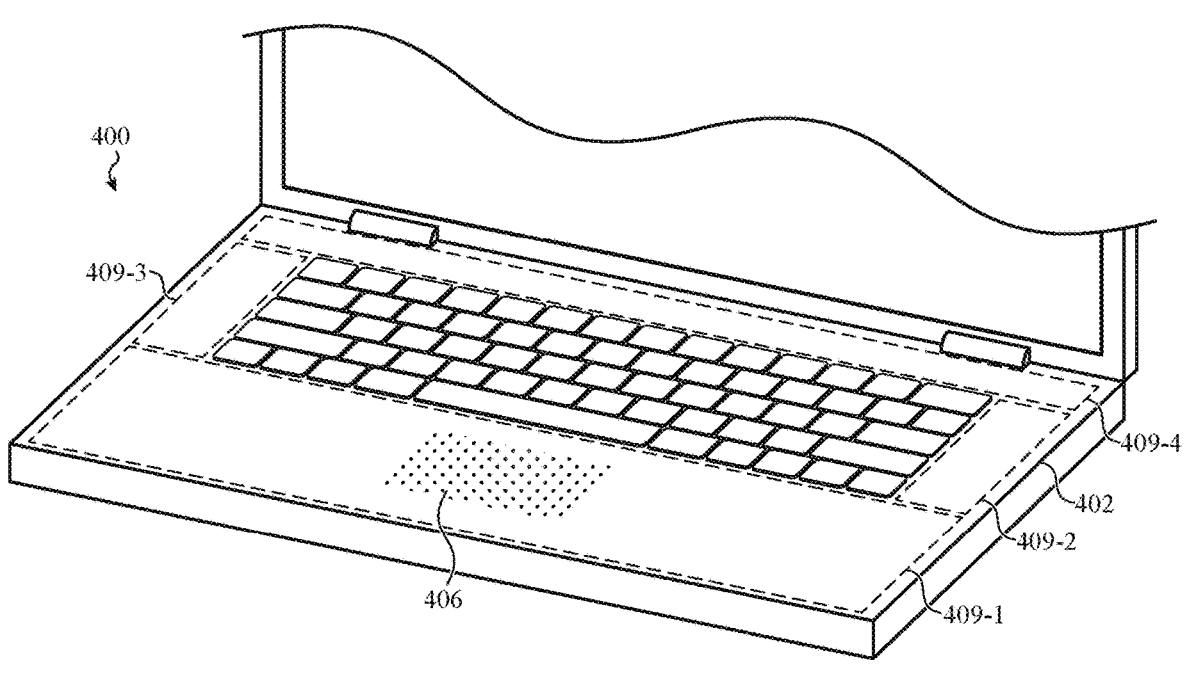
FIG. 4A depicts a portion of an example computing device in a first mode of operation.
Figure 4B:
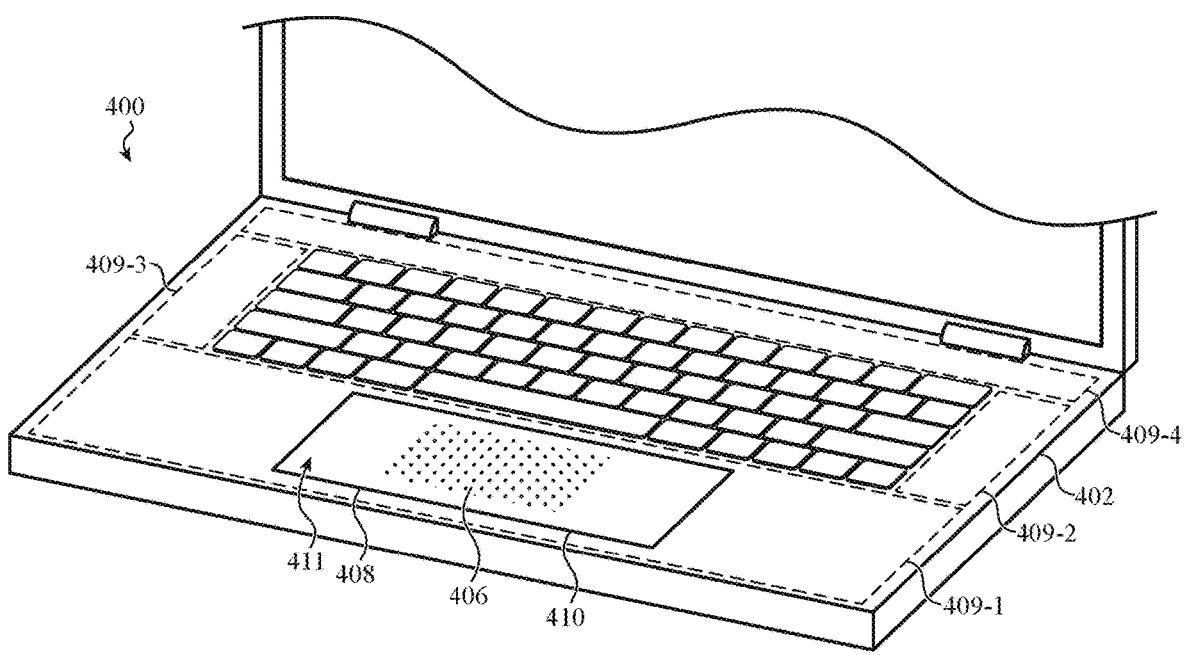
FIGS. 4B-4D depict the computing device of FIG. 4A in various second modes of operation.

FIGS. 4A-4B illustrate a portion of a device 400 that has a surface texture on a portion of a cover 402, as described above. The device 400 may be an embodiment of the device 100 of FIG. 1 and therefore may include the same and/or similar components as the device 100.

The device 400 may include a cover 402 (which may be an embodiment of the cover 112) that may be light-transmissive along at least a portion of the cover 402. The cover 402 may define a single keyboard opening in which a keyboard may be positioned, or it may define a key web with multiple openings for keys of the keyboard. Like the cover 112, the cover 402 may define first, second, third, and fourth touch-sensitive input region 409-1-409-4.

As shown in FIG. 4A, a region 406 of the cover 402 within the first touch-sensitive input region 409-1 has a first surface texture (represented by the dotted pattern in FIG. 4A), and surrounding and/or adjacent regions of the cover 402 have a second surface texture of lower roughness than the first surface texture (e.g., the second surface texture may be smoother than the first surface texture). In some cases, the entire remainder of the top exterior surface of the cover 402 has the second surface texture. More particularly, in some cases the second, third, and fourth touch-sensitive input regions 409-2-409-4 have the second surface texture (e.g., they may be polished surfaces). The first surface texture may be any suitable texture and may be formed in any suitable way. For example, the first surface texture may be formed by etching (chemical etching, mechanical etching, laser etching, plasma etching, mold etching, etc.), grinding, machining, abrasive blasting, flocking, coating (e.g., powder coating, film application, etc.), or any other suitable technique.

The textured region 406 of the cover 402 may correspond to a trackpad region in which a user may provide touch inputs. In some cases, the textured region 406 represents the smallest area that the device offers as a trackpad region. Thus, if the device 400 is in a mode where trackpad-style inputs are accepted, a user can expect that inputs applied to the textured region 406 will be registered as inputs. However, as noted above, improved functionality and features may be provided by allowing displays that are positioned beneath the cover 402 to dynamically display differently sized and shaped input regions. Accordingly, techniques such as those described above for dynamically changing the size and shape of the input regions may be applied to devices with textured surfaces as well. Moreover, additional techniques may be used to help mitigate or reduce the visual and/or tactile differences between the areas of different surface textures.

FIG. 4A depicts the device 400 in an example first mode of operation in which the device 400 responds to trackpad inputs applied to the textured region 406, but not to the un-textured (e.g., smooth) region of the cover 402 that surrounds and/or is adjacent to the textured region 406. FIG. 4B depicts the device 400 in an example second mode of operation, which may correspond to a different application program being active on the device 400. In the second mode of operation, the device 400 may activate an expanded input region 410, which may include displaying a graphical output 408 that at least partially surrounds the textured region 406 and defines the expanded input region 410. The graphical output 408 is shown as a distinct border that encompasses the textured region 406 (which may correspond to the first region 316 in FIG. 3A) and an additional area 411 (which may correspond to part of the second region 318 in FIG. 3B). However, it will be understood that other graphical outputs may be used to define the expanded input region 410, including colors, images, or the like. When the device 400 is in the second mode of operation, the device 400 may also respond to trackpad inputs applied within the expanded input region 410, and not merely to inputs within the textured region 406.

Figure 4C:
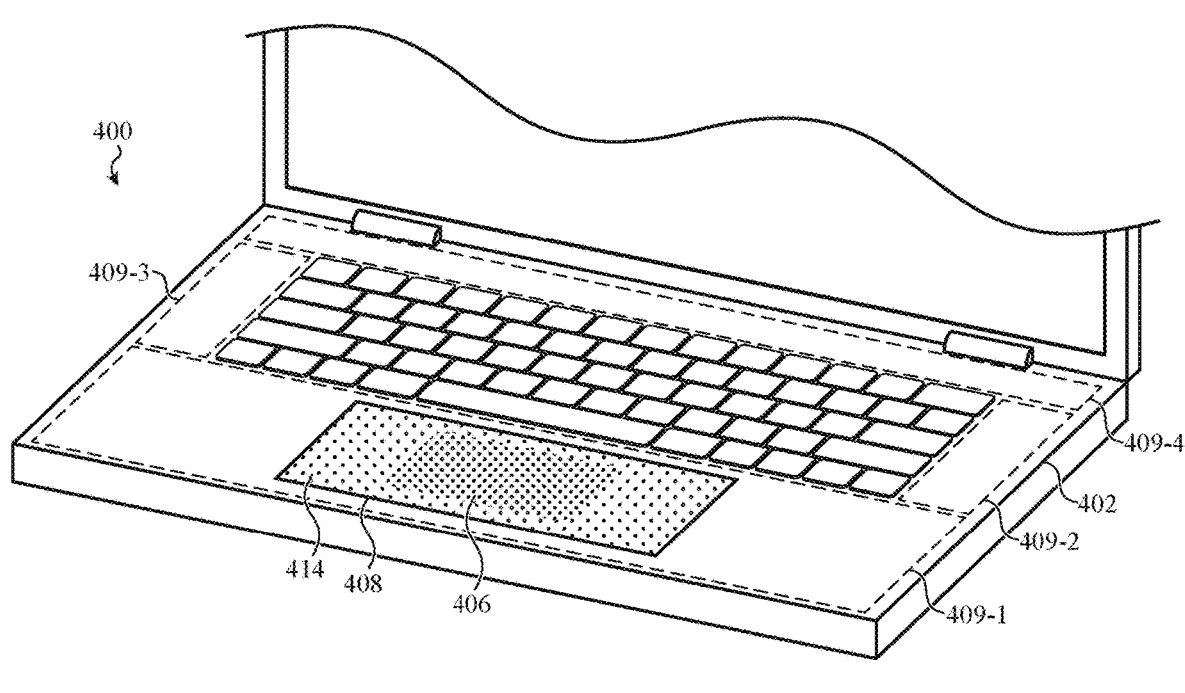

FIG. 4C depicts the device 400 in an alternate second mode of operation where a display that is under the cover 402 (and more particularly under the first touch-sensitive input region 409-1) displays a first graphical output 408 (e.g., a border) that at least partially surrounds the textured region 406 and defines the boundary of an expanded input region, as well as a second graphical output 414 that mimics or otherwise resembles the visual appearance of the surface texture of the textured region 406. For example, the second graphical output 414 may be an image having a pattern (or other graphical content) that, when viewed through the light-transmissive cover 402, makes the entire expanded input region visually appear to have the same or a similar texture. This may help signal to a user that the entire expanded input region may be used to receive trackpad inputs, and may help avoid or reduce confusion due to the presence of differently textured areas within the expanded trackpad region.

Figure 4D:
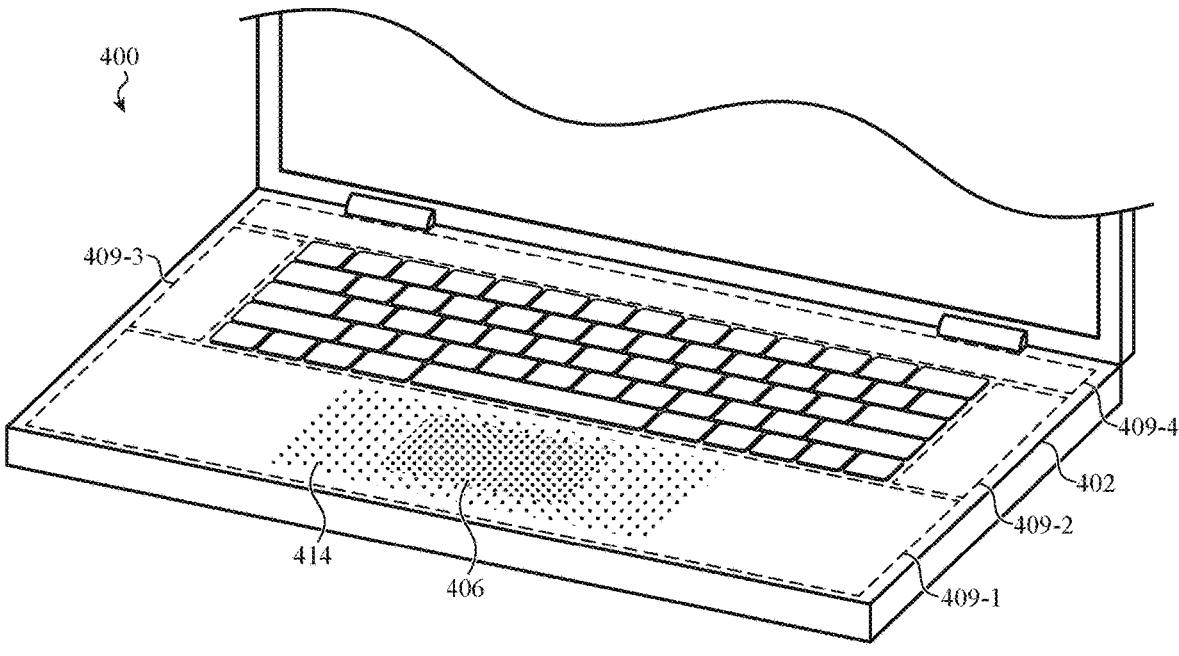

FIG. 4D depicts the device 400 in another alternate second mode of operation where a display that is under the cover 402 (and more particularly under the first touch-sensitive input region 409-1) displays the second graphical output 414, but omits a distinct border (e.g., line) that surrounds the second graphical output 414. A device with a textured input region as described herein may be configured to use only one particular graphical output arrangement for its second mode of operation, or it may be configured to use various arrangements in the second mode of operation. For example, when a first application program is being executed, the device may be in a first mode in which no expanded input region is active. When a second application program is being executed, the device may use the graphical output described with respect to FIG. 4B to indicate the expanded input region, and when a third application program is being executed, the device may use the graphical output described with respect to FIG. 4C to indicate the expanded input region. Other combinations are also contemplated.

While FIGS. 4A-4D illustrate techniques for reducing the difference in visual appearance between differently textured regions of a cover, the different textures remain tactilely different. For example, when a user slides a finger along the surface of the expanded input region, the user will be able to feel a difference between the textured region 406 and the smooth region (or differently textured region) outside of the textured region 406. In order to address this issue, the device may produce a haptic output to reduce the tactile difference between the textured region and the surrounding smooth (or differently textured) region.

Figure 5A:
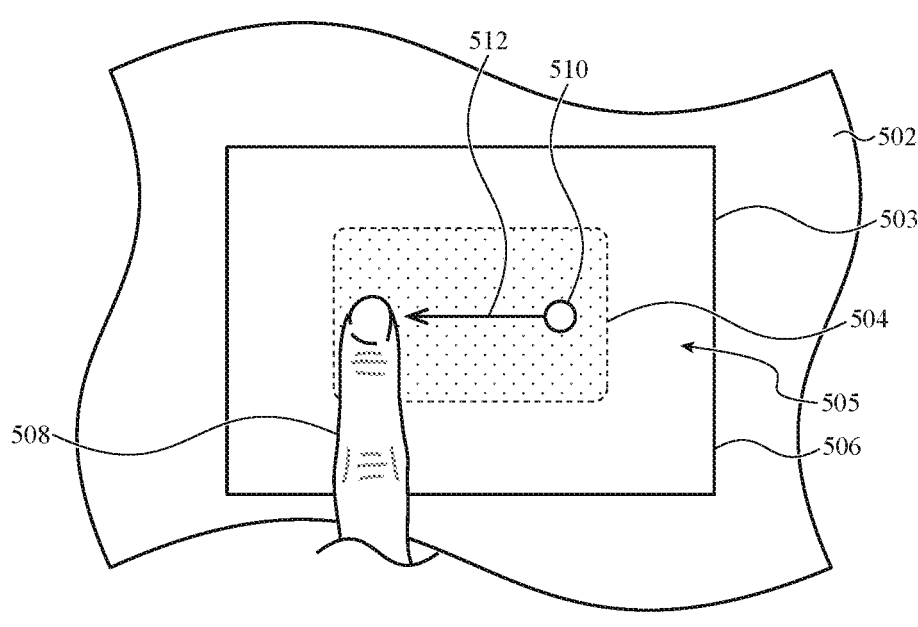
FIGS. 5A-5B depict an example computing device that produces a haptic output in response to a touch input.
Figure 5B:
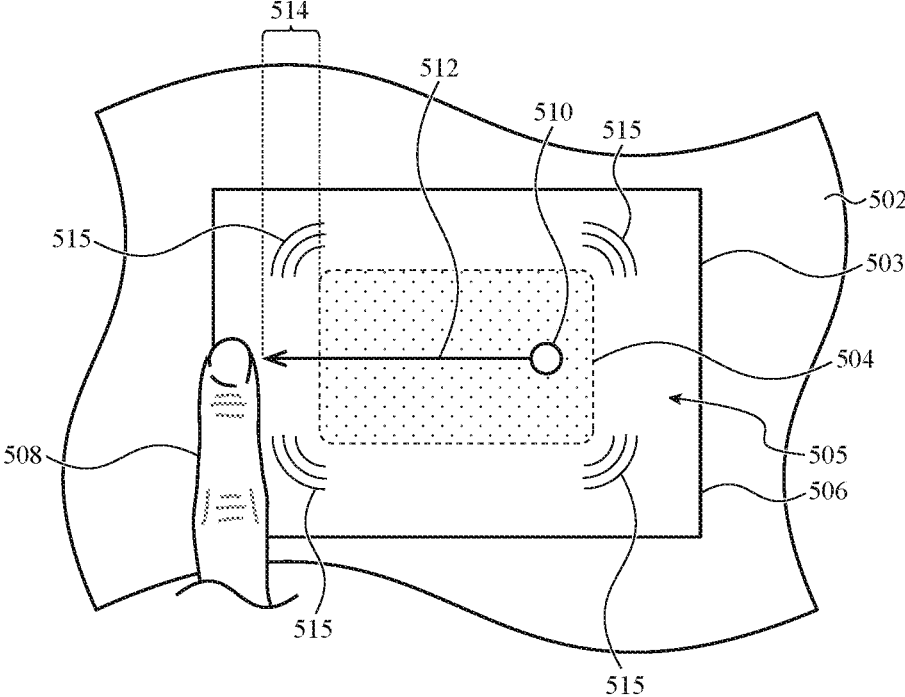

FIGS. 5A-5B depict a portion of a cover 502 of a device (e.g., the device 100 or any other device described herein) that includes a textured region 504, shown by a stippling pattern, and a graphical output 503 defining an expanded input region 506. The expanded input region 506 includes an adjacent region 505, shown without stippling, that has a lower roughness than the textured region 504 (e.g., the adjacent region 505 may be smoother than the textured region 504).

As described herein, the graphical output 503 may be produced by a display under the palm rest region of a laptop computer. As shown, the graphical output 503 includes a solid border. However, it will be understood that other graphical outputs may be used instead of or in addition to the solid border that is shown, such as a graphical output that produces an appearance of a texture, as described above. In some cases, no graphical output is displayed.

In FIG. 5A, as a user moves a finger 508 from an initial touch location 510 along a path 512 (e.g., to cause a cursor to move positions on a display), the textured region 504 may impart or produce a particular tactile feel. For example, the roughness of the textured region 504 may have (or may feel as though it has) less friction than a smooth glass surface. Due to the difference in roughness between the textured region 504 and the adjacent region 505, when the user's finger 508 leaves the textured region 504 and enters the adjacent region 505 (e.g., along path segment 514), the user may detect a tactile difference between the regions.

In order to reduce the tactile difference between the textured region 504 and the adjacent region 505, a device may produce a haptic output when the user's finger 508 is detected in the adjacent region 505 and within the boundary of the expanded input region 506. The presence of the user's finger 508 outside the textured region 504 and within the adjacent region 505 may be determined by a touch- and/or force-sensing system of the device (e.g., the sensing system 909, FIG. 9).

The haptic output may be any suitable haptic output, such as a vibration, oscillation, acoustic wave, electrostatic haptic output, local deformation of the cover 502, or the like. The haptic output may be produced by any suitable haptic actuator, such as a moving or oscillating mass, an electrode, a piezoelectric material, or the like. For example, the cover 502 or a portion thereof may be shifted side-to-side (e.g., in a direction that is substantially parallel with the exterior surface of the cover 502). The side-to-side movement may be induced by a side-to-side action of the haptic actuator. As another example, the cover 502 may be moved up and down (e.g., in a direction that is substantially perpendicular to the exterior surface of the cover). The up and down movement may be induced by an up and down action of the haptic actuator. The haptic output is represented in FIG. 5B by lines 515, but the haptic output need not produce any particular sound or motion of the cover 502.

The haptic output may reduce the tactile difference between the regions in several ways. For example, the haptic output may reduce an actual or perceived friction of the adjacent region 505 (which may have a higher coefficient of friction than the textured region 504). As another example, an electrostatic haptic output may produce an oscillating attractive or repulsive force on the finger 508 that continuously changes the actual or perceived friction of the adjacent region 505. In some cases, the haptic output does not actually change the coefficient of friction between the finger 508 and the cover 502. In such case, the haptic output may still indicate to a user that his or her finger 508 is within the expanded trackpad region even when the finger 508 is no longer within the textured region 504. Accordingly, the user may easily determine when he or she is interacting with the trackpad region, even without having to look directly at the palm rest region. The haptic output may cease when the user's finger is outside of the expanded input region 506 to indicate to the user that his or her finger is outside of the region that is being used to accept trackpad style inputs.

The haptic output may be produced based on the detected location of a user's finger 508 relative to the textured region 504 and the adjacent region 505. For example, when the user's finger 508 is detected within the textured region 504, there may be no haptic output (or at least no haptic output that is configured to reduce a tactile difference). When the user's finger 508 is detected outside the textured region 504 and within the adjacent region 505, the haptic output may be produced to reduce the tactile difference between the regions. When the user's finger 508 is detected outside of the expanded input region 506, there may be no haptic output. Due to the lower roughness and the lack of a haptic output, the user may perceive a tactile difference outside of the expanded input region 506, indicating to the user that he or she is outside of the expanded input region 506 and that touch and/or force inputs may not be detected (or may be treated differently by the device).

The portion of the cover 502 in FIGS. 5A-5B may be any portion of a cover of a device. For example, it may be or correspond to a palm rest region, or any other suitable region of the cover 502 (e.g., the second, third, or fourth touch-sensitive input regions 109-2-109-4, in FIG. 1). Moreover, a haptic output may be used to reduce the tactile difference between any two surfaces having different textures, whether or not the textures are associated with a palm rest region of a device.

As described herein, the cover of a device (e.g., a laptop computer) may be formed of a light-transmissive (e.g., transparent) material, such as glass, polymer, ceramic, etc., and a display may be positioned under the light-transmissive cover to display various types of graphical outputs through the cover. In some cases, graphical outputs may be displayed within regions that are typically used for trackpad inputs, such as on the palm rest region of a cover. As noted above, however, a cover may include textured regions to provide a desirable tactile feel to a trackpad region and to help tactilely and visually distinguish the trackpad region. However, such textured regions, while still being sufficiently light-transmissive to allow a graphical output to be viewed through the textured regions, may distort or diffuse the graphical output as compared to non-textured regions of the cover. Accordingly, graphical outputs that span a textured and a non-textured region (or that are displayed near a textured region) may be modified or otherwise configured to reduce the difference in appearance caused by the textured region.

Figure 6A:
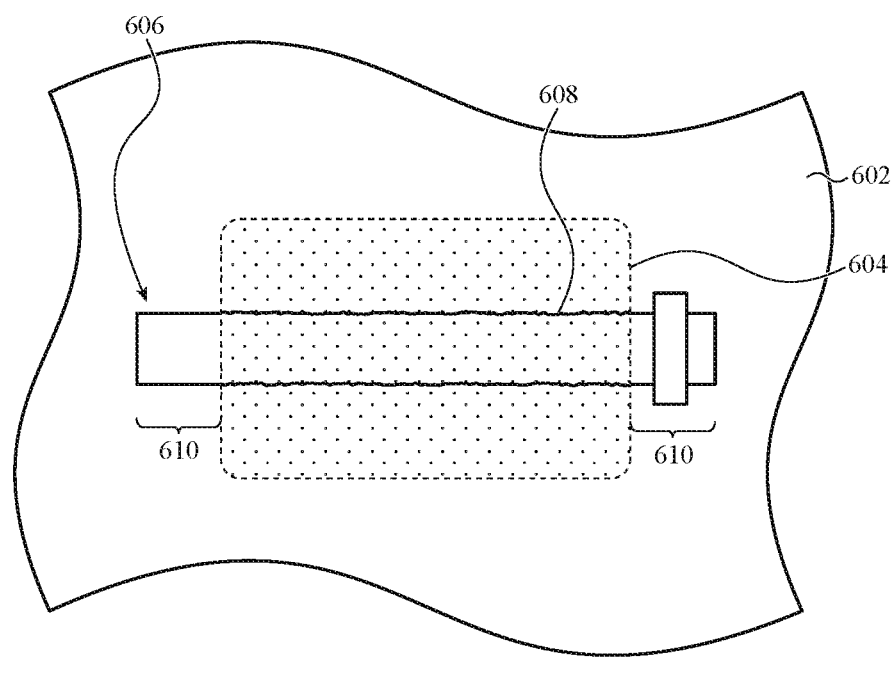
FIGS. 6A-6C depict example graphical outputs displayed under a textured region of a cover.
Figure 6B:
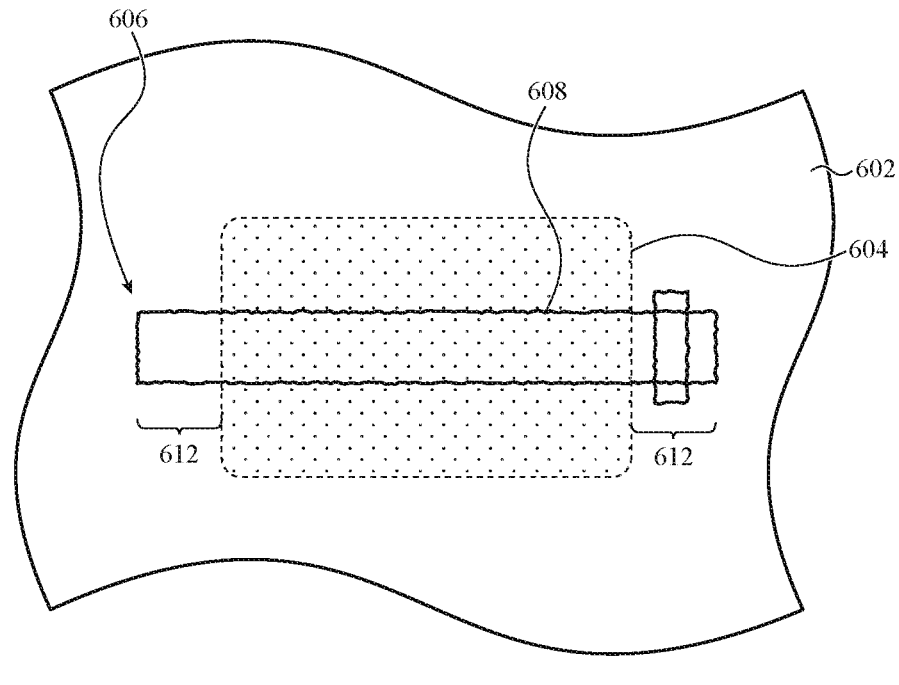
Figure 6C:
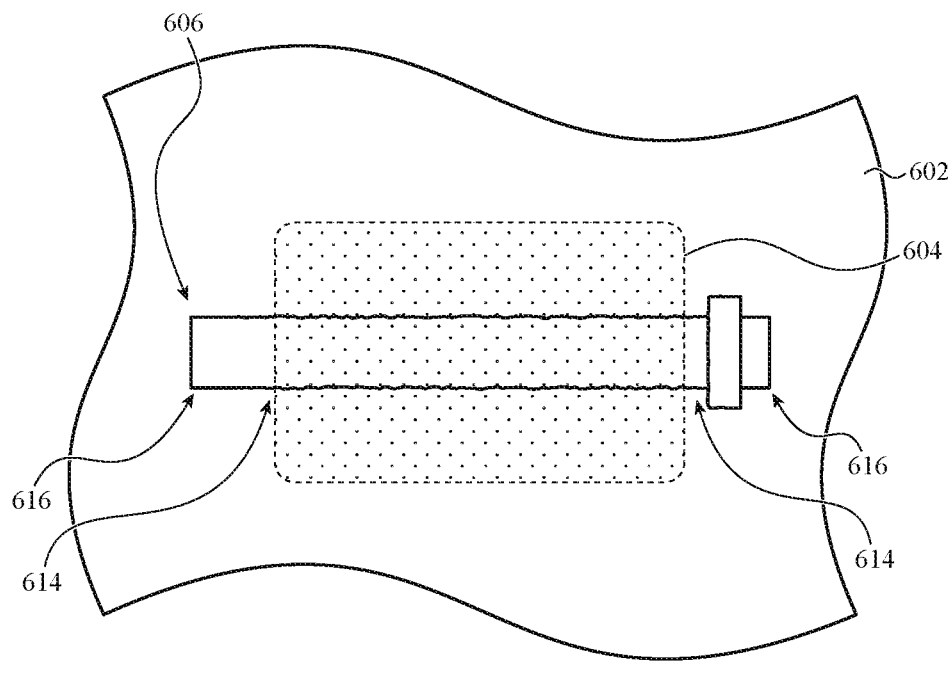

FIGS. 6A-6C depict a portion of a cover 602 of a device (e.g., the device 100 or any other device described herein) that includes a textured region 604, shown by a stippling pattern, and an adjacent, non-textured region 605. A graphical output 606 is displayed by a display that is positioned under the cover 602. As shown, the graphical output 606 is a slider bar, though this is merely an example that represents any graphical output.

FIG. 6A depicts how the graphical output 606 may appear if it is displayed without modification. In particular, the portion 608 of the graphical output 606 that is under the textured region 604 may appear distorted, while the portion 610 that is outside of the textured region 604 may appear undistorted. As shown, there is a sharp distinction between the distorted and the undistorted portions. In some cases, this appearance may be acceptable or desirable.

In some cases, however, the graphical output 606 may be modified or otherwise configured to reduce the sharp transition between the distorted portion and the undistorted portion of a graphical output. FIG. 6B illustrates an example in which a portion 612 of the graphical output 606 that is displayed outside of the textured region 604 is configured to have a distorted appearance, which may match or be similar to the appearance of the portion 608 that is under the textured region 604. For example, the portion 612 of the graphical output 606 may be modified (e.g., with an image overlay, pixel-wise image modification, or any other suitable technique) to produce a blurred or otherwise distorted appearance. While the graphical output 606 may not be as sharp or distinct as it would be if displayed under a non-textured region of the cover 602, it may have a consistent appearance that helps hide the effect of the textured region 604 on the graphical output.

FIG. 6C illustrates an example in which the portion of the graphical output 606 that is displayed under the non-textured region of the cover transitions from a distorted or blurred appearance 614 to a sharp (e.g., not blurred or distorted) appearance 616. In some cases, the transition from the blurred appearance 614 to the sharp appearance 616 may be gradual. This may help eliminate the distinct difference in appearance between the textured and non-textured regions, thereby producing less distracting graphical outputs and mitigating the negative optical effects of the textured region 604.

As described above, a light-transmissive cover may include an integral key web (e.g., the key web may be a portion of a monolithic cover component). The key web may include or otherwise define members that are positioned between adjacent keycaps, which, like the rest of the cover, may be light-transmissive. The key web may also be associated with a light source that is configured to illuminate or otherwise display images, colors, or other visible outputs through the key web. As used herein, visible outputs may include any illuminated output that is visible to a user, including solid colored light, graphical outputs, images, or the like. As noted above, the light source may be or may include a display, one or more individual sources of light (e.g., individual LEDs), light guides, and/or any other combination of illumination components. Notably, the light source illuminates (or otherwise displays visible output through) the material that forms the key web, and not merely an empty space between adjacent keycaps.

Figure 7A:
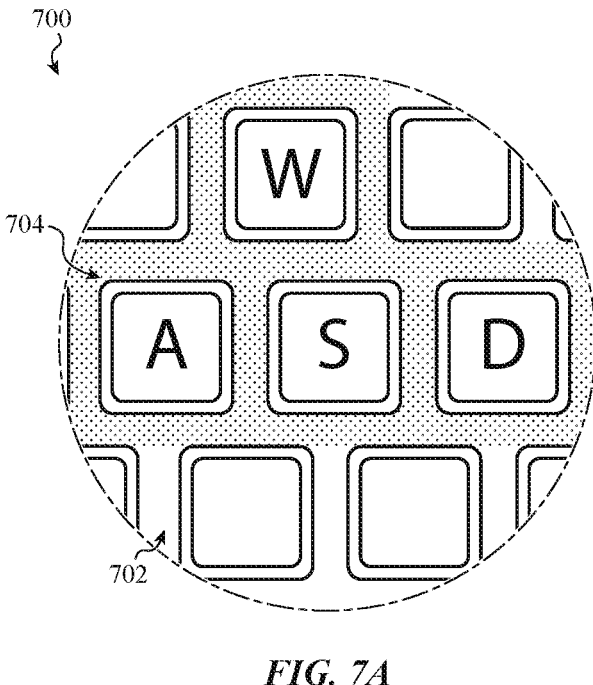
FIGS. 7A-7B depict example illumination patterns of a key web.
Figure 7B:
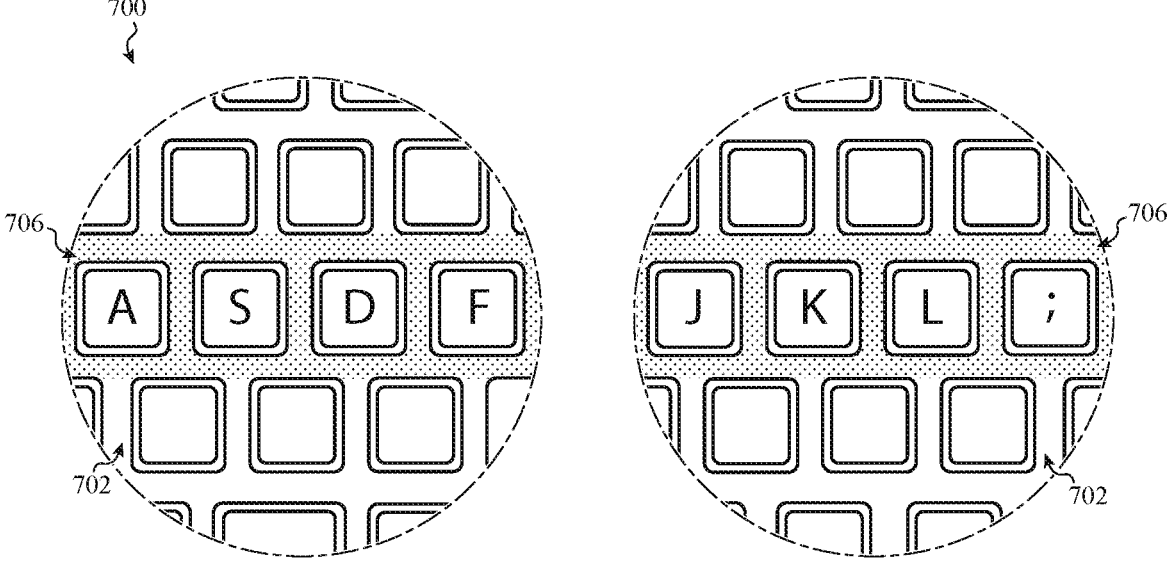

The light-transmissive key web and the corresponding light source may be configured to produce various dynamic visual effects via the key web. For example, in cases where the light source is or includes a display, graphical outputs may be displayed through the key web. Further, different areas of the key web may be illuminated differently from one another, and the areas that are illuminated may change based on active applications, user preference, ambient light characteristics (e.g., as determined by light-sensitive sensors), or the like. FIGS. 7A-7B illustrate an example of a key web showing how different areas of the key web may be differently illuminated.

FIG. 7A depicts a portion of a keyboard 700, which may correspond to the keyboard 114 (or any other keyboard described herein). The keyboard 700 may be included in a device such as a laptop computer (e.g., the computing device 100). The keyboard 700 includes a key web 702, which may be light-transmissive (e.g., transparent).

As shown in FIG. 7A, the device is in a first mode of operation, in which a first portion 704 of the key web 702 is illuminated with a first illumination pattern (as represented by a stippling pattern). The illuminated first portion 704 of the key web 702 surrounds each keycap of a subset of keycaps. A localized illumination pattern such as that shown in FIG. 7A may be used to direct a user to a particular key or set of keys. The particular keys that are surrounded (or otherwise indicated) with an illumination pattern may be determined based on the mode of operation of the device (e.g., the particular application program being executed by the computer). For example, FIG. 7A shows the "WASD" keys illuminated, which may be selected because a gaming application is active (and the "WASD" keys may be used for directional control in the gaming application). FIG. 7B depicts the keyboard 700 when the device is in a second mode of operation, in which a second portion 706 of the key web 702 is illuminated with a second illumination pattern (as represented by a stippling pattern). The second illumination pattern overlaps the first illumination pattern. FIGS. 7A-7B only show some keycaps having glyphs. In some cases, all keycaps have permanent (e.g., painted, dyed, etched) glyphs. In other cases, the same display that underlies the key web may also display graphical outputs that are visible through the keycaps and any underlying key mechanisms. In such cases, the display may display different key glyphs or other graphical outputs based on the mode of operation of the device.

The second mode of operation may correspond to a different application program being executed by the device. For example, while the illumination pattern shown in FIG. 7A may be displayed when a gaming program is active (a first mode of operation), the second illumination pattern shown in FIG. 7B may be shown when a word processing application is open. For example, FIG. 7B shows an illumination pattern illuminating the home row of a keyboard, which may be used to help direct a user to the home position for typing text into the word processing (or other text entry) application.

FIGS. 7A-7B show how localized portions of the key web 702 (e.g., less than the entirety of the key web 702) are illuminated. This may be facilitated by a pixelated display underlying the key web 702, which may be able to selectively illuminate different regions of the key web 702. In such cases, the pixel density of the underlying display (or other light source) may be greater than one pixel per keycap. For example, it may be greater than 10, 20, 50, 100, or 200 pixels per inch. In this way, the display may have sufficient resolution for the illumination patterns to have distinct borders. Moreover, the display resolution and the optical properties of the key web may be configured so that individual segments of the key web can be illuminated (e.g., a single keycap can be surrounded by a distinct illumination pattern without light leaking substantially to other parts of the key web).

Moreover, because the underlying light source may be a display that can selectively illuminate different regions, the key web is not limited to any particular fixed illumination pattern or set of illumination patterns. For example, individual application programs may specify what colors, images, or other graphical or visible outputs to present via the key web, and specify the locations and/or patterns of the colors, images, or other graphical or visible outputs. In this way, the manner in which the key web is illuminated may be widely variable. Moreover, the illumination pattern need not be static. Rather, the patterns may dynamically change to produce animations or other moving and/or changing visible output. For example, the key web can be animated to simulate a moving wave or band that directs the user's attention to a key or area of the keyboard. The animation could also expand outward from a key to provide an indication that an input was received. The latter effect may produce an appearance of drops landing in water, with each key strike producing a new ripple. As another example, an animation or visible output may be controlled by the speed of a user's typing. For example, the key web may transition between various colors while a user is typing. When the user ceases typing, the color ceases changing; when the user types faster, the color may change at a faster rate. Other effects are also contemplated.

Figure 8A:
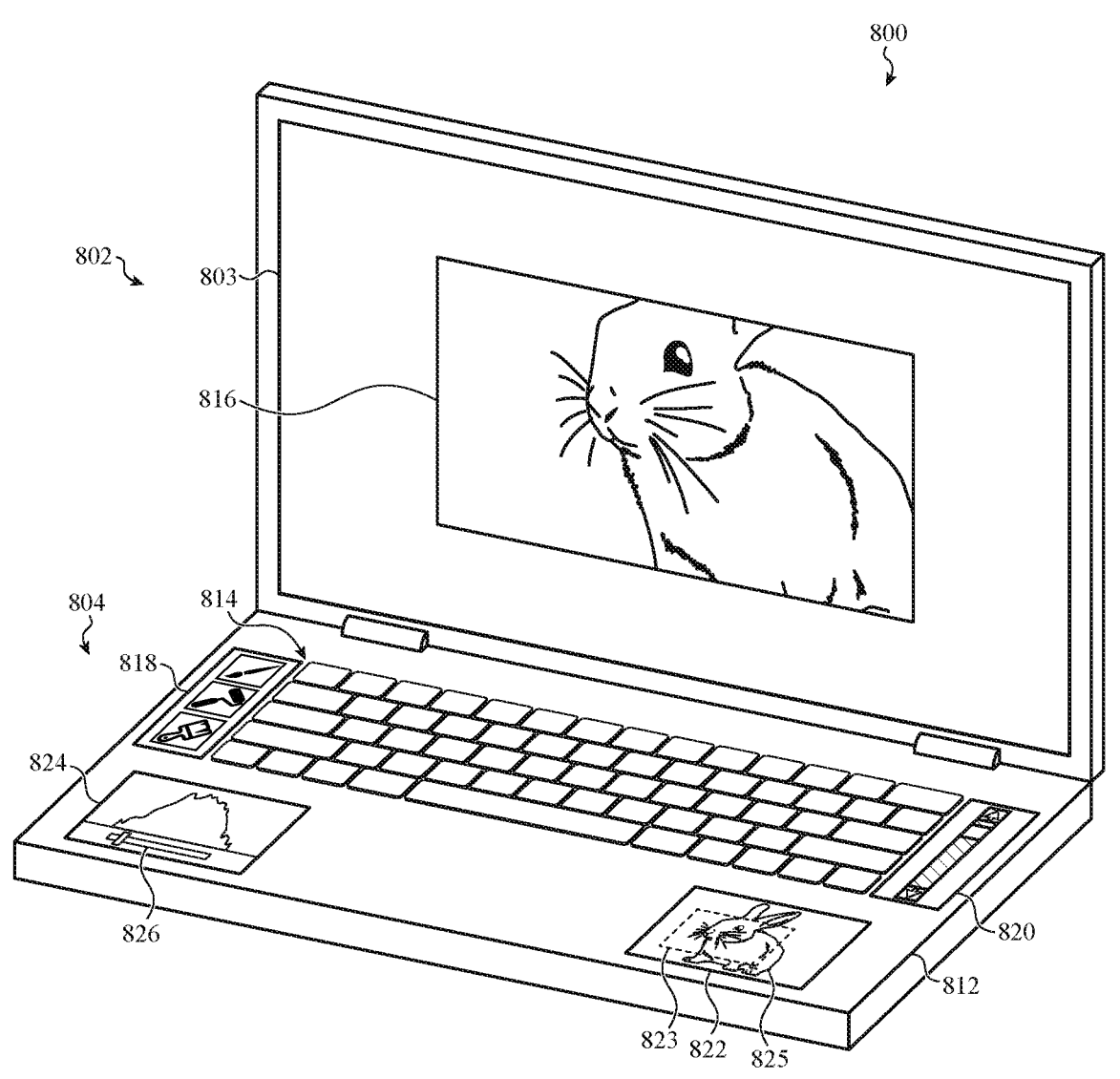
FIGS. 8A-8C depict an example electronic device displaying graphical outputs on a base portion of the electronic device.
Figure 8B:
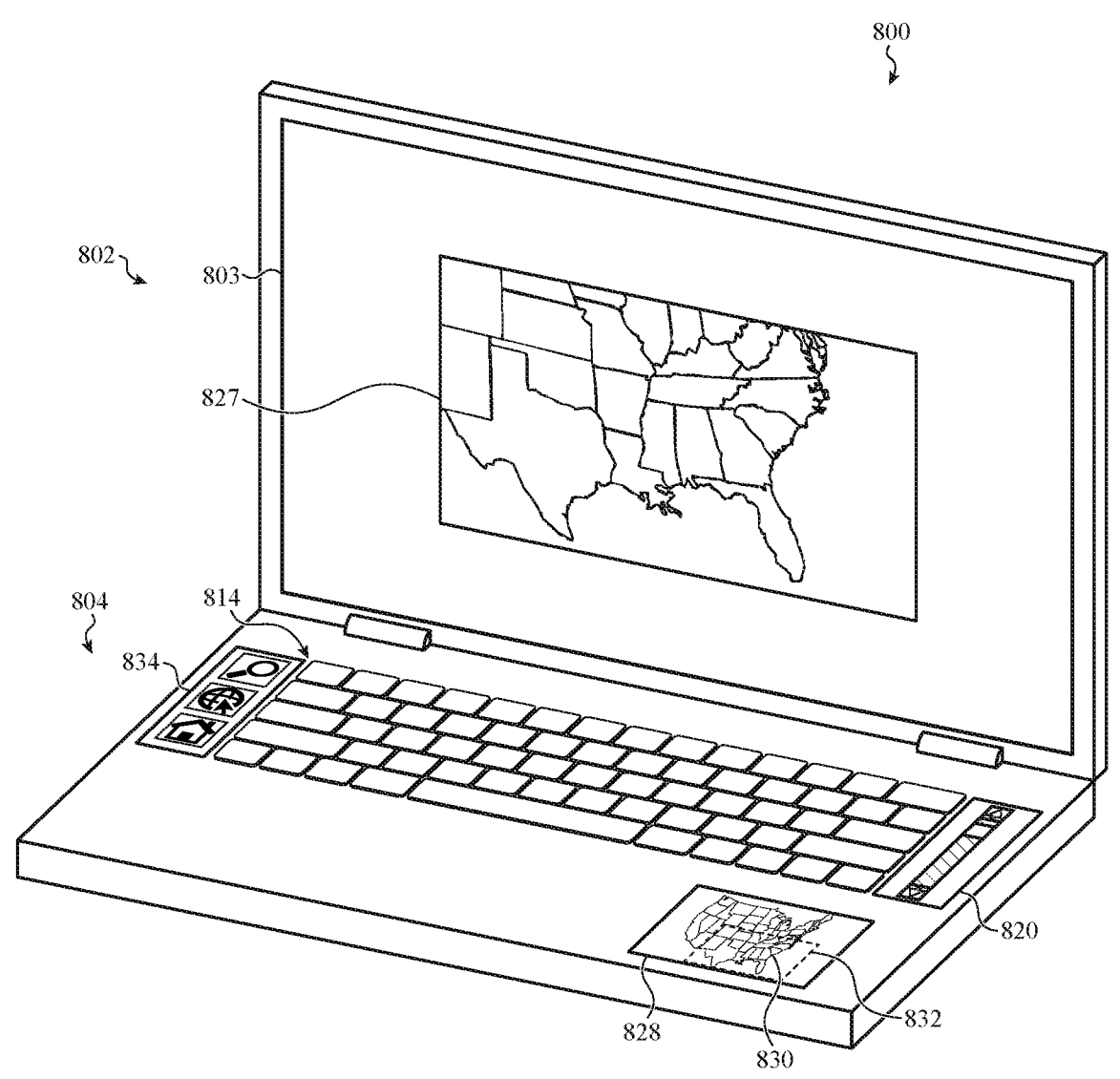
Figure 8C:
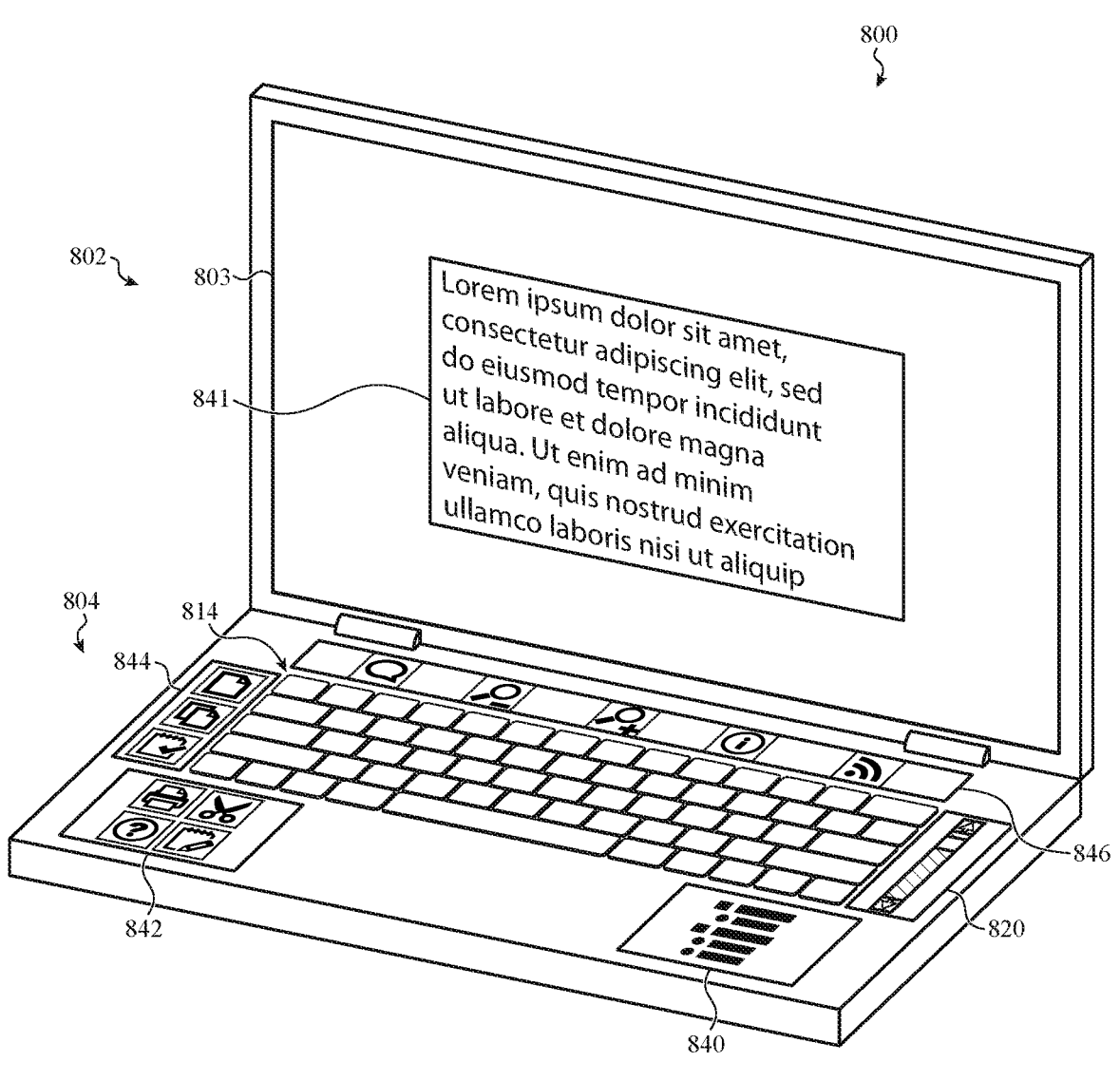

As noted above, the combination of a display and a light-transmissive (e.g., transparent) cover over the display in a base portion of a computer allows detailed graphical outputs to be displayed on areas of the cover below, above, and along the sides of a keyboard. The integration of touch-and/or force-sensing systems further allows a user to interact with such images in various ways. The particular graphical outputs that are displayed via the cover may depend on the state of operation of the device (e.g., the particular application program that is being executed, the graphical content that is displayed on a primary display, or the like). In some cases, the graphical output displayed in touch-sensitive regions that are adjacent a keyboard can be interacted with in order to control the operation of the device and/or an application program active on the device. FIGS. 8A-8C depict several examples of devices in which the graphical outputs on the base portion are coordinated with (and may be used to control) what is being displayed on the primary display of the device. FIGS. 8A-8C also depict how particular types of graphical outputs and/or user interface elements may be consistently located in a particular region of a cover.

FIG. 8A depicts an example device 800, which may be the same as or similar to the device 100 in FIG. 1. The device 800 includes a display portion 802 with a primary display 803. The device 800 also includes a base portion 804 with a cover 812, which may be light-transmissive (e.g., transparent), as described above. The base portion 804 may also include a keyboard 814, which may be a mechanical keyboard with keys that extend at partially through openings in a key web defined by the cover 812.

In FIG. 8A, the primary display 803 is displaying a graphical user interface associated with an active first application program. The graphical user interface includes a display of a first portion 816 of an image. Other components of the graphical user interface are omitted for clarity. In this example, the active first application program may correspond to an image viewing and/or editing program, though this is merely illustrative of one type of application program that may be used in conjunction with the described techniques.

While the first application program is active, several graphical outputs may be displayed via the cover 812 (e.g., by an underlying display such as the display system 205, FIG. 2A). For example, a first graphical output 822 associated with the first application program may be displayed along the palm rest region of the device 800 (e.g., the first touch-sensitive input region 109-1, FIG. 1). The first graphical output 822 may be any suitable graphical output, and a user may interact with the first graphical output 822 to control one or more aspects of the active application program. For example, as shown in FIG. 8A, the first graphical output 822 is a second portion 825 of the image (e.g., the first and second portions 816, 825 of the image may be portions of the same image). The second portion 825 of the image may include the entire image to allow the user to quickly see the full image (e.g., all of the image) that is being edited or viewed via the application program, even if the first portion 816 of the image on the primary display is showing only a smaller sub-portion of the full image. The first graphical output 822 may also include an indicator 823 (e.g., a preview window) that indicates which segment of the image is being shown on the primary display. A user may be able to interact with the indicator 823 (e.g., by touching the cover where the indicator 823 is displayed) to change the contents of the graphical user interface. For example, by touching the sides and/or corners of the indicator 823 and expanding or contracting the indicator 823 (e.g., by pinching or un-pinching), the user may effectively zoom the first portion 816 of the image. As another example, by moving the indicator 823 to a different location in the second portion 825 of the image (e.g., so that the indicator 823 surrounds a different segment of the image), the first portion 816 of the image may change to correspond to the segment of the image that is within or otherwise indicated by the indicator 823. Other interactions and/or manipulations are also possible.

While the first graphical output 822 is being displayed (and optionally any other graphical outputs shown or described), a second graphical output associated with the application program may be displayed along a second input region. For example, FIG. 8A shows a second graphical output 818 displayed along the region to the left of the keyboard 814 (e.g., the second touch-sensitive input region 109-2, FIG. 1). As shown, the second graphical output 818 defines selectable controls that control an operation of the application program active on the device 800. As shown in FIG. 8A, the selectable controls of the second graphical output 818 are icons that include graphics and/or text to indicate the functions that are controlled by the icons. Other types of selectable controls are also contemplated.

Other graphical outputs may be displayed in addition to the first and second graphical outputs 822, 818 described with respect to FIG. 8A. For example, FIG. 8A shows an additional graphical output 824 displayed along the palm rest region of the device 800. The additional graphical output 824 may include an image curve, histogram, or other graphical representation of a property of the image that is being viewed and/or edited. The additional graphical output 824 also includes a slider bar 826 (or any other suitable affordance or graphical output) with which a user may interact to modify the property of the image that is represented by the image curve or histogram. Also, another additional graphical output associated with the application program may be displayed along a third input region (e.g., the third touch-sensitive input region 109-3, FIG. 1). The additional graphical output includes a slider bar 820 for scrolling a displayed image or other graphical output on the primary display, though any other type of selectable control may also be presented. As noted above, the type and/or locations of the graphical outputs may be customizable by a user. For example, a user may configure the device so that a slider bar (e.g., the slider bar 820) is located along the left side of the keyboard (e.g., where the second graphical output 818 is shown in FIG. 8A). Such customizations may be consistent across multiple applications or modes of operation (e.g., so that a slider bar is always displayed on the left side of the keyboard if scrolling functionality is available). Alternatively, such customizations may be different for different applications or modes of operation (e.g., the user may want a slider bar on the left side when using a photo editing application, and on the right side when using a web browsing application). Such customizations or settings may be applied to any of the graphical outputs described herein.

FIG. 8B depicts the device 800 when a second application program is active, where the second application program is different from the first application program. For example, while application program in FIG. 8A may be an image editing and/or viewing program, the application program active in FIG. 8B may be a map or navigation application. Accordingly, the graphical user interface on the primary display 803 in FIG. 8B may include a portion 827 of an image, where the image is a map.

When the second application program is active, the device may display different graphical outputs via the cover 812 than those that are displayed when the first application program is active. For example, a third graphical output 828 associated with the second application program may be displayed along the palm rest region of the device 800 (e.g., the first touch-sensitive input region 109-1, FIG. 1). The third graphical output 828 may be similar in function to the first graphical output 822. For example, the third graphical output 828 may include a second portion 830 of the image (e.g., a portion of the same map shown in the primary display 803). More particularly, the second portion 830 of the image may include the entire map to allow the user to quickly see the full map, even if the first portion 827 of the map on the primary display is showing only a smaller sub-portion of the full map. The third graphical output 828 may also include an indicator 832 that indicates which portion of the map is being shown on the primary display. The user may be able to interact with the indicator 832 to change the contents of the graphical user interface, as described with respect to FIG. 8A.

When the second application program is active, as shown in FIG. 8B, the second graphical output 818 may be replaced with a fourth graphical output 834, which may also be displayed along the region to the left of the keyboard 814 (e.g., the second touch-sensitive input region 109-2, FIG. 1). As shown, the fourth graphical output 834 defines different selectable controls than those that were included in the second graphical output 818. This may occur due to the difference in selectable functions that are available for or useful to the different application program that is active. More particularly, the first application program may be an image editing and/or viewing application with selectable functions that are pertinent to image editing and/or viewing, while the second application program may be a map program with selectable functions that are pertinent to viewing and manipulating maps. While the second and fourth graphical outputs 818, 834 may be different selectable functions, they may be similar in graphical presentation and/or the types of functions. Thus, by presenting both the second and fourth graphical outputs 818, 834 in the same location on the cover 812, the user can reliably look to that location to find similar controls, regardless of the particular application that is active.

When the second application program is active, the slider bar 820 may also be displayed. The slider bar 820 may be manipulated to scroll or move the portion of the map (or other graphical output) on the primary display. Once again, presenting the slider bar 820 in the same touch-sensitive input region (e.g., the third touch-sensitive input region 109-3, FIG. 1) regardless of which application program is active helps provide a consistent user interface where a user can expect to find the same type of affordances in the same location across multiple applications. Of course, in cases where an application program or a graphical user interface associated with the application program does not use a particular type of affordance or control, a touch-sensitive input region that is otherwise dedicated to that particular type of affordance or control may be blank or may have a different type of affordance or control.

FIG. 8C depicts the device 800 when a third application program is active, where the third application program is different from the first and the second application programs. For example, the application program active in FIG. 8C may be a word processing application, or another application that accepts text inputs and/or allows manipulations of documents and/or presentations. Accordingly, the graphical user interface on the primary display 803 in FIG. 8C may include a portion 841 of a document with text content (e.g., a word processing document).

When the third application program is active, the device may display different graphical outputs via the cover 812 than those that are displayed when the first and/or second application programs are active. For example, a fifth graphical output 840 associated with the third application program may be displayed along the palm rest region of the device 800 (e.g., the first touch-sensitive input region 109-1, FIG. 1). The fifth graphical output 840 may be a document map that shows the contents, pages, sections, headings, or other summary of the document that the displayed portion 841 is part of. Like the first and third graphical outputs 822, 828, the user may be able to control what is displayed on the primary display 803 by interacting with the fifth graphical output 840, such as by touching a section heading to cause the displayed portion 841 of the document to jump to the selected section. Accordingly, the fifth graphical output 840, while distinct from the reference images of the first and third graphical outputs 822, 828, has a similar function as those graphical outputs in that they all provide a higher-level context to what is shown on the primary display 803. In this way the use of consistent regions of the cover 812 for similar affordances is further reinforced, despite differences in appearance or exact function. Also, when the third application program is active, the slider bar 820 may also be displayed in the same location as when the first and second application programs were active (e.g., the third touch-sensitive input region 109-3, FIG. 1).

When the third application program is active, as shown in FIG. 8C, a sixth graphical output 844 may be displayed along the region to the left of the keyboard 814 (e.g., the second touch-sensitive input region 109-2, FIG. 1). As shown, the sixth graphical output 844 defines different selectable controls than those that were included in the second and fourth graphical outputs 818, 834. This may occur due to the difference in selectable functions that are available for or useful to the different application program that is active. More particularly, the first application program may be primarily graphics-based programs (e.g., displaying photographs, images, maps, etc.), while the third application program may be a word processing program with selectable functions that are pertinent to entering and editing text. Thus, while the second, fourth, and sixth graphical outputs 818, 834, 844 may all include different selectable functions, they may be similar in graphical presentation and/or the types of functions that they relate to. Thus, by presenting the second, fourth, and sixth graphical outputs 818, 834, 844 in the same location on the cover 812, the user can reliably look to that location to find similar controls, regardless of the particular application that is active.

For some application programs, it may be desirable to provide more selectable controls than may be conveniently included in the second touch-sensitive input region. In such cases, additional graphical outputs 842, 846 may be displayed via the cover 812. The additional graphical outputs 842, 846 may include more selectable controls that have a similar appearance and/or type of function as those in the sixth graphical output 844. In other cases, however, any other types of graphical output, affordance, or information may be presented in the additional graphical outputs 842, 846. Further, because the display within the base portion 804 may underlie multiple areas of the cover 812 (including optionally substantially the entire cover 812), the additional graphical outputs 842, 846 may be displayed at any suitable location on the cover 812. For example, FIG. 8C shows one additional graphical output 842 displayed in the palm rest region of the cover 812 (e.g., corresponding to the first touch-sensitive input region 109-1, FIG. 1), and another additional graphical output 846 displayed above the keyboard 814 (e.g., corresponding to the fourth touch-sensitive input region 109-4, FIG. 1). Of course, other locations for such additional graphical outputs are also possible.

While FIGS. 8A-8C illustrate various example graphical outputs, other types of graphical outputs may also be presented. Further, while the graphical outputs in FIGS. 8A-8C all include some aspect that can be interacted with via touch inputs (e.g., they are or include touch-sensitive controls), graphical inputs need not all act as inputs. For example, a background graphic, similar to a wallpaper on a primary display, may be displayed via the cover 812. The background graphic may be a still graphic (e.g., a photograph) or an animated graphic (e.g., a video). The background graphic may also change based on the application program that is active.

Figure 9:
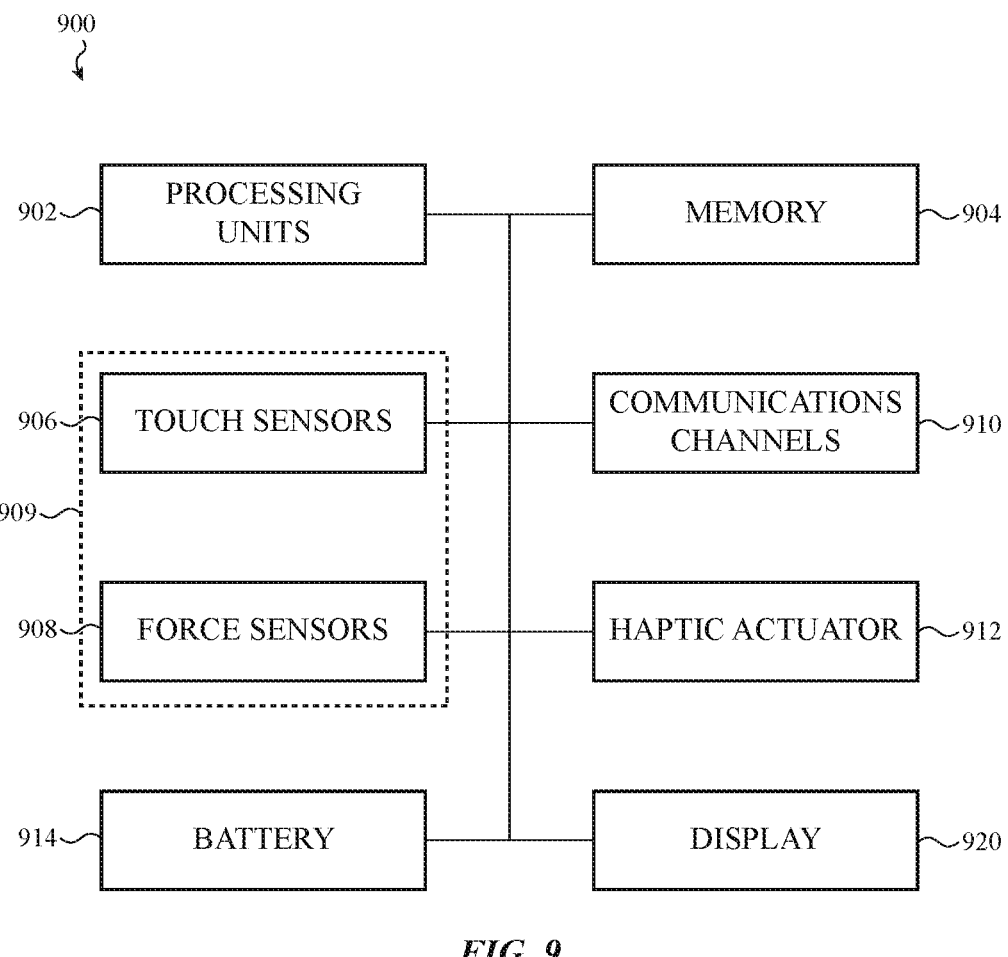
FIG. 9 depicts a schematic diagram of an example electronic device.

FIG. 9 depicts an example schematic diagram of an electronic device 900. By way of example, device 900 of FIG. 9 may correspond to the computing device 100 shown in FIG. 1 (or any other similar computing device described herein). To the extent that multiple functionalities, operations, and structures are disclosed as being part of, incorporated into, or performed by the device 900, it should be understood that various embodiments may omit any or all such described functionalities, operations, and structures. Thus, different embodiments of the device 900 may have some, none, or all of the various capabilities, apparatuses, physical features, modes, and operating parameters discussed herein.

As shown in FIG. 9, the device 900 includes one or more processing units 902 that are configured to access a memory 904 having instructions stored thereon. The instructions or computer programs may be configured to perform one or more of the operations or functions described with respect to the device 900. For example, the instructions may be configured to control or coordinate the operation of one or more displays 920, one or more touch sensors 906, one or more force sensors 908, one or more communication channels 910, and/or one or more haptic actuators 912.

The processing units 902 of FIG. 9 may be implemented as any electronic device capable of processing, receiving, or transmitting data or instructions. For example, the processing units 902 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or any other suitably configured computing element or elements.

The memory 904 can store electronic data that can be used by the device 900. For example, a memory can store electrical data or content such as, for example, audio and video files, documents and applications, device settings and user preferences, timing and control signals or data for the various modules, data structures or databases, and so on. The memory 904 can be configured as any type of memory. By way of example only, the memory can be implemented as random access memory, read-only memory, Flash memory, removable memory, or other types of storage elements, or combinations of such devices.

The touch sensors 906 (also referred to herein as touch sensing systems) may detect various types of touch-based inputs and generate signals or data that are able to be accessed using processor instructions. The touch sensors 906 may use any suitable components and may rely on any suitable phenomena to detect physical inputs. For example, the touch sensors 906 may be capacitive touch sensors, resistive touch sensors, acoustic wave sensors, or the like. The touch sensors 906 may include any suitable components for detecting touch-based inputs and generating signals or data that are able to be accessed using processor instructions, including electrodes (e.g., electrode layers), physical components (e.g., substrates, spacing layers, structural supports, compressible elements, etc.), processors, circuitry, firmware, and the like. The touch sensors 906 may be integrated with or otherwise configured to detect touch inputs applied to a cover of a computing device, such as the cover 112 in FIG. 1, and in particular to detect touch inputs applied to a touch-sensitive input region of a device (e.g., the touch-sensitive input regions 109, FIG. 1). Touch inputs detected by the touch sensors 906 may include gestures, multi-touch inputs, taps, swipes, and the like. The touch sensors 906 may operate in conjunction with the force sensors 908 to generate signals or data in response to touch inputs.

The force sensors 908 (also referred to herein as force sensing systems) may detect various types of force-based inputs and generate signals or data that are able to be accessed using processor instructions. The force sensors 908 may use any suitable components and may rely on any suitable phenomena to detect physical inputs. For example, the force sensors 908 may be strain-based sensors, piezoelectric-based sensors, piezoresistive-based sensors, capacitive sensors, resistive sensors, or the like. The force sensors 908 may include any suitable components for detecting force-based inputs and generating signals or data that are able to be accessed using processor instructions, including electrodes (e.g., electrode layers), physical components (e.g., substrates, spacing layers, structural supports, compressible elements, etc.), processors, circuitry, firmware, and the like. The force sensors 908 may be used in conjunction with various input mechanisms to detect various types of inputs. For example, the force sensors 908 may be used to detect clicks, presses, or other force inputs applied to a touch-sensitive input region (e.g., the touch-sensitive input regions 109, FIG. 1) defined by a cover of a device (e.g., the cover 112, FIG. 1). The force sensors 908 may be configured to determine a magnitude of a force input (e.g., representing an amount of force along a graduated scale, rather than a mere binary "force/no-force" determination). The force sensors 908 and/or associated circuitry may compare the determined force magnitude against a threshold value to determine what, if any, action to take in response to the input. The force sensors 908 may operate in conjunction with the touch sensors 906 to generate signals or data in response to touch- and/or force-based inputs.

The touch sensors 906 and the force sensors 908 (which may also be referred to as touch and force sensing systems) may be considered part of a sensing system 909. The sensing system 909 may include touch sensors alone, force sensors alone, or both touch and force sensors. Moreover, the sensing system 909 may provide touch sensing functions and/or force sensing functions using any configuration or combination of hardware and/or software components, systems, subsystems, and the like. For example, some force sensing components and associated circuitry may be capable of determining both a location of an input as well as a magnitude of force (e.g., a non-binary measurement) of the input. In such cases, a distinct physical touch-sensing mechanism may be omitted. In some examples, physical mechanisms and/or components may be shared by the touch sensors 906 and the force sensors 908. For example, an electrode layer that is used to provide a drive signal for a capacitive force sensor may also be used to provide the drive signal of a capacitive touch sensor. In some examples, a device includes functionally and/or physically distinct touch sensors and force sensors to provide the desired sensing functionality.

The device 900 may also include one or more haptic actuator(s) 912. The haptic actuator(s) 912 may include one or more of a variety of haptic technologies such as, but not necessarily limited to, rotational haptic devices, linear actuators, piezoelectric devices, vibration elements, and so on. In general, the haptic actuator(s) 912 may be configured to provide punctuated and distinct feedback to a user of the device. More particularly, the haptic actuator(s) 912 may be adapted to produce a knock or tap sensation and/or a vibration sensation. Such haptic outputs may be provided in response to detection of touch- and/or force-based inputs, such as detection of force inputs on a touch-sensitive input region (e.g., the touch-sensitive input regions 109, FIG. 1). Haptic outputs may be local or global, as described herein, and may be imparted to a user through various physical components, such as a top case of a notebook computer, as described herein.

The one or more communication channels 910 may include one or more wireless interface(s) that are adapted to provide communication between the processing unit(s) 902 and an external device. In general, the one or more communication channels 910 may be configured to transmit and receive data and/or signals that may be interpreted by instructions executed on the processing units 902. In some cases, the external device is part of an external communication network that is configured to exchange data with wireless devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, infrared interfaces, USB interfaces, Wi-Fi interfaces, TCP/IP interfaces, network communications interfaces, or any other conventional communication interfaces.

As shown in FIG. 9, the device 900 may include a battery 914 that is used to store and provide power to the other components of the device 900. The battery 914 may be a rechargeable power supply that is configured to provide power to the device 900 while it is being used by the user.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

Moreover, the foregoing figures and descriptions include numerous concepts and features, which may be combined in numerous ways to achieve numerous benefits and advantages. Thus, features, components, elements, and/or concepts from various different figures may be combined to produce embodiments or implementations that are not necessarily shown or described together in the present description. Further, not all features, components, elements, and/or concepts shown in a particular figure or description are necessarily required in any particular embodiment and/or implementation. It will be understood that such embodiments and/or implementations fall within the scope of this description.

What is claimed is:

1. A laptop computer comprising:
   a display portion comprising a primary display configured to display a first graphical output; and
   a base portion coupled to the display portion, the base portion comprising:
   a keyboard comprising a set of keys;
   a touch-sensitive input region positioned along a side of the keyboard and defining:
      a first portion having a first surface texture; and
      a second portion surrounding the first portion and having a second surface texture that is different from the first surface texture; and
   a secondary display positioned under the touch-sensitive input region, and configured to output an image along the first portion and the second portion of the touch-sensitive input region, wherein:
      the first surface texture results in a distortion of a portion of the image that is displayed along the first portion of the touch-sensitive input region; and
      the image is configured to produce a visual appearance, at the second portion of the touch-sensitive input region, that mimics an appearance of the distorted portion of the image at the first portion of the touch-sensitive input region.

2. The laptop computer of claim 1, wherein the second surface texture of the second portion is smoother than the first surface texture of the first portion.

3. The laptop computer of claim 1, wherein:

the first surface texture is formed by the base portion; and the second surface texture is formed by the base portion.

4. The laptop computer of claim 1, wherein:

the image defines an input object that corresponds to an input function that can be performed at the touch-sensitive input region; and the laptop computer is configured to update the image in response to a user input detected at the touch-sensitive input region.

5. The laptop computer of claim 1, wherein the touch-sensitive input region corresponds to a palm rest region that is below the keyboard.

6. The laptop computer of claim 1, wherein:

the base portion further comprises a housing component; and the base portion comprises a monolithic glass member that is attached to the housing component.

7. The laptop computer of claim 6, wherein the base portion further comprises a continuous input surface extending over the touch-sensitive input region.

8. A laptop computer comprising:

a display portion comprising a primary display configured to display a graphical user interface; and a base portion coupled to the display portion, the base portion comprising:

a keyboard comprising a set of keys;

a touch-sensitive input region along a bottom side of the keyboard and including a first region having a first surface texture and a second region that at least partially surrounds the first region and has a second surface texture that is different from the first surface texture; and a secondary display positioned under the touch-sensitive input region and configured to display a graphical output, the graphical output displayed at the first region and the second region, the first surface texture results in a distortion of a portion of the graphical output that is displayed at the first region, and the graphical output is configured to produce a visual appearance, within the second region, that mimics an appearance of the distorted portion of the graphical output at the first region.

9. The laptop computer of claim 8, wherein:

the first surface texture of the first region has a first roughness; and the second surface texture of the second region has a second roughness that is smoother than the first roughness.

10. The laptop computer of claim 9, further comprising a light transmissive cover positioned over the touch-sensitive input region, wherein the light transmissive cover defines the first surface texture and the second surface texture.

11. The laptop computer of claim 8, further comprising a haptic actuator coupled to the touch-sensitive input region, wherein the haptic actuator is configured to produce a haptic output in response to detecting a touch input to the touch-sensitive input region.

12. The laptop computer of claim 11, wherein:

the laptop computer is configured to determine an applied force of the touch input; and the haptic output is produced in response to determining that the applied force exceeds a threshold force.

13. The laptop computer of claim 8, wherein:

the graphical output defines an input object; and the laptop computer is configured to update the graphical output in response to a user input detected at the touch-sensitive input region.

14. The laptop computer of claim 13, wherein the input object corresponds to a function that can be performed by the laptop computer.

15. A laptop computer comprising:

a display portion comprising a primary display configured to display a graphical user interface associated with an application program;

a base portion pivotally coupled to the display portion, the base portion comprising:

a keyboard comprising a set of electromechanical keys;

a light-transmissive cover defining an input region along a side of the keyboard and defining:

a first portion having a first surface texture; and a second portion adjacent the first portion and having a second surface texture different from the first surface texture;

a touch sensing system configured to detect touch inputs applied to the input region; and an additional display positioned under the light-transmissive cover and configured to display a graphical output, the graphical output displayed at the first portion of the light-transmissive cover and the second portion of the light-transmissive cover, the first surface texture results in a distortion of a portion of the graphical output that is displayed at the first portion of the light-transmissive cover, and the graphical output is configured to produce a visual appearance, within the second portion, that mimics an appearance of the distorted portion of the graphical output at the first portion of the light-transmissive cover.

16. The laptop computer of claim 15, wherein the side of the keyboard is a palm rest region below the keyboard.

17. The laptop computer of claim 16, wherein:

the first surface texture is formed from the light-transmissive cover; and the second surface texture is formed from the light-transmissive cover.

18. The laptop computer of claim 17, wherein the second surface texture of the second portion is smoother than the first surface texture of the first portion.

19. The laptop computer of claim 15, wherein:

the graphical output defines an input object; and the laptop computer is configured to update the graphical output in response to a user input detected by the touch sensing system.

* * * * *